United States Patent
Fan et al.

(10) Patent No.: US 10,230,469 B2
(45) Date of Patent: Mar. 12, 2019

(54) APPARATUS FOR MEASURING A FILTERING CHARACTERISTIC, PRE-EQUALIZER AND OPTICAL COMMUNICATION EQUIPMENT

(71) Applicant: FUJITSU LIMITED, Kawasaki (JP)

(72) Inventors: Yangyang Fan, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/375,533

(22) Filed: Dec. 12, 2016

(65) Prior Publication Data

US 2017/0170901 A1    Jun. 15, 2017

(30) Foreign Application Priority Data

Dec. 11, 2015   (CN) .......................... 2015 1 0920199

(51) Int. Cl.
*H04B 10/2507* (2013.01)
*H04B 10/079* (2013.01)

(52) U.S. Cl.
CPC . *H04B 10/25073* (2013.01); *H04B 10/07955* (2013.01)

(58) Field of Classification Search
CPC ............ H04B 10/07955; H04B 10/077; H04B 10/00; H04B 10/25073; H04J 14/0221; H04J 14/0227
See application file for complete search history.

(56) References Cited

U.S. PATENT DOCUMENTS

| 6,389,068 B1 * | 5/2002 | Smith .................. H04L 1/0015 370/468 |
| 8,270,311 B2 | 9/2012 | Lindqvist et al. |
| 2005/0009471 A1 * | 1/2005 | Paul ..................... H04B 17/309 455/62 |

FOREIGN PATENT DOCUMENTS

| CN | 1711736 A | 12/2005 |
| CN | 102025327 A | 4/2011 |

(Continued)

OTHER PUBLICATIONS

Danish Rafique et al., "Digital Pre-emphasis in Optical Communication Systems: On the DAC Requirements for Terabit Transmission Applications", Journal of Lightwave Technology, vol. 32, No. 19, Oct. 1, 2014, pp. 3247.

(Continued)

*Primary Examiner* — Ted Wang
(74) *Attorney, Agent, or Firm* — Staas & Halsey LLP

(57) ABSTRACT

Provided is an apparatus for measuring a filtering characteristic, a pre-equalizer and an optical communication equipment where the apparatus includes: a first processing unit configured to determine a filtering characteristic of a receiving end, or determine a joint response of a filtering characteristic of a transmitting end and the filtering characteristic of the receiving end, in a spectrum of a receiving signal obtained after a first measurement signal and a second measurement signal pass through respective filtering modules, according to a nonoverlapped spectral part of the first measurement signal and the second measurement signal. The filtering modules through which the first measurement signal passes include a transmitting end filtering module and a receiving end filtering module, the filtering module through which the second measurement signal passes include the receiving end filtering module.

19 Claims, 15 Drawing Sheets

(56) References Cited

FOREIGN PATENT DOCUMENTS

CN 102141608 A 8/2011
WO WO 2010/048982 A1 5/2010

OTHER PUBLICATIONS

Antonio Napoli et al., "Novel DAC digital pre-emphasis algorithm for next-generation flexible optical transponders", OFC2015 Th3G.6.

Xiang Zhou et al., "64-Tb/s, 8 b/s/Hz, PDM-36QAM Transmission Over 320 km Using Both Pre- and Post-Transmission Digital Signal Processing", Journal of Lightwave Technology, vol. 29, No. 4, Feb. 15, 2011, pp. 571-577.

Zhensheng Jia et al., "Performance Analysis of Pre- and Post-Compensation for Bandwidth-Constrained Signal in High-Spectral-Efficiency Optical Coherent Systems", OFC2014, W3K.3.

Juan Qi et al., "Generation of 28GBaud and 32GBaud PDM-Nyquist-QPSK by a DAC with 11.3GHz Analog Bandwith", OFC2013, Oth1F.1.

* cited by examiner

APPARATUS FOR MEASURING A FILTERING CHARACTERISTIC, PRE-EQUALIZER AND OPTICAL COMMUNICATION EQUIPMENT

CROSS-REFERENCE TO RELATED APPLICATIONS

This application claims the priority benefit of Chinese Patent Application No. 201510920199.4, filed on Dec. 11, 2015 in the Chinese Intellectual Property Office, the disclosure of which is incorporated herein in its entirety by reference.

BACKGROUND

1. Field

The present disclosure relates to the field of communications, and in particular to an apparatus for measuring a filtering characteristic, a pre-equalizer and optical communication equipment.

2. Description of the Related Art

As the requirements of an optical communication system on low cost, miniature and flexible configuration, optical and electrical bandwidths of a transmitter of the optical communication system are reduced for various reasons. Currently, a problem of narrow bandwidth may be overcome by using pre-equalization, pre-distortion and pre-emphasis technologies in a digital domain.

FIG. 1 is a schematic diagram of a transmitter in the related art using the digital pre-equalization technology. As shown in FIG. 1, the transmitter 100 includes an emitter 101, a pre-equalizer 102, a digital-to-analog converting module 103, a laser 104 and an optical modulator 105, the optical modulator 105 including a pluggable interface, and an electrical driving amplifier, etc.; for example, the emitter 101 emits digital electrical signals, the pre-equalizer 102 pre-compensates for a filtering damage to the emitted digital electrical signals brought about by subsequent filtering modules of the transmitter 100, such as the digital-to-analog converting module 103 and the optical modulator 105, the compensated digital electrical signals are converted into analog signals after passing through the digital-to-analog converting module 103, and optical signals are outputted after the analog signals are modulated by the optical modulator 105. Here, the filtering damage brought about by the subsequent modules after the pre-equalizer 102 in the transmitter is referred to as a filtering characteristic of a transmitting end.

FIG. 2 is a schematic diagram of a receiver in the related art. As shown in FIG. 2, the receiver 200 includes an optical coherent demodulator 201, a local laser 202, an analog-to-digital converting module 203 and a receiving device 204; for example, optical signals outputted from the transmitter 100 are demodulated into analog electrical signals by the optical coherent demodulator 201, the analog electrical signals are converted into digital electrical signals by the analog-to-digital converting module 203, and the digital electrical signals are received by the receiving device 204. And, a filtering damage exists in the optical signals outputted from the transmitter 100 after passing through the filtering modules of the receiver 200, such as the optical coherent demodulator 201 and the analog-to-digital converting module 203. Here, the filtering damage is referred to as a filtering characteristic of a receiving end.

Currently, a common frequency domain or time domain method may be used for pre-equalization, and a coefficient of a pre-equalizer may be obtained by using many methods in the related art, such as zero forcing, and minimum mean square error, etc.; however, a filtering characteristic of a transmitting end needs to be known to these methods.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the embodiments.

At present, instruments are often used to measure a filtering characteristic of a transmitting end or a receiving end, which is high in cost, and is hard in large-scale use.

Embodiments of the present disclosure provide a method and apparatus for measuring a filtering characteristic, pre-equalizer and optical communication equipment. In the method, the filtering characteristics of the receiving end and the transmitting end may be determined by using the two measurement signals of different spectral ranges by the transmitter and the receiver themselves, with no need of use of extra instrument, thereby avoiding the problems of high cost and uneasy large-scale use brought about by measurement of filtering characteristic by using instruments.

The above aim of the embodiments of the present disclosure is achieved by the following technical solutions.

According to a first aspect of the embodiments of the present disclosure, there is provided an apparatus for measuring a filtering characteristic, including:

a first processing unit configured to determine a filtering characteristic of a receiving end, or determine a joint response of a filtering characteristic of a transmitting end and a filtering characteristic of a receiving end, in a spectrum of a receiving signal obtained after a first measurement signal and a second measurement signal pass through respective filtering modules, according to a nonoverlapped spectral part of the first measurement signal and the second measurement signal;

wherein, the filtering modules through which the first measurement signal passes include a transmitting end filtering module and a receiving end filtering module, the filtering module through which the second measurement signal passes include the receiving end filtering module, spectral ranges of the first measurement signal and the second measurement signal are different, and at least one of them is a discrete signal.

According to a second aspect of the embodiments of the present disclosure, there is provided a pre-equalizer, including:

a characteristic measuring unit configured to determine a filtering characteristic of a receiving end in a spectrum of a receiving signal obtained after a first measurement signal and a second measurement signal pass through respective filtering modules according to a nonoverlapped spectral part of the first measurement signal and the second measurement signal, and determine a joint response of the filtering characteristic of the receiving end and a filtering characteristic of a transmitting end according to an overlapped spectral part of the first measurement signal and the second measurement signal;

or, determine a joint response in a spectrum of a receiving signal obtained after a first measurement signal and a second measurement signal pass through respective filtering modules according to a nonoverlapped spectral part of the first measurement signal and the second measurement signal, and determine the filtering characteristic of the receiving end according to an overlapped spectral part of the first measurement signal and the second measurement signal;

and determine the filtering characteristic of the transmitting end according to the filtering characteristic of the receiving end and the joint response; and a pre-equalizing unit configured to determine a coefficient of the pre-equalizer according to the filtering characteristic of the transmitting end, and perform pre-equalization on a transmission signal by using the coefficient of the pre-equalizer;

wherein, the filtering modules through which the first measurement signal passes include a transmitting end filtering module and a receiving end filtering module, the filtering module through which the second measurement signal passes include the receiving end filtering module, spectral ranges of the first measurement signal and the second measurement signal are different, and at least one of them is a discrete signal.

According to a third aspect of the embodiments of the present disclosure, there is provided optical communication equipment, including the apparatus for measuring a filtering characteristic as described in the first aspect.

An advantage of the embodiments of the present disclosure exists in that in the method, the filtering characteristics of the receiving end and the transmitting end may be determined by using the two measurement signals of different spectral ranges by the transmitter and the receiver themselves, with no need of use of extra instrument, thereby avoiding the problems of high cost and uneasy large-scale use brought about by measurement of filtering characteristics by using instruments.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

These and/or other aspects and advantages will become apparent and more readily appreciated from the following description of the embodiments, taken in conjunction with the accompanying drawings of which:

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings:

FIG. 1 is a schematic diagram of a transmitter in the related art using the digital pre-equalization technology;

FIG. 2 is a schematic diagram of a receiver in the related art;

FIG. 3 is a flowchart of a method for measuring a filtering characteristic of Embodiment 1;

FIG. 4 is a flowchart of an implementation of step 303 in Embodiment 1;

FIG. 5 is a flowchart of an implementation of step 304 in Embodiment 1;

FIG. 6 is a schematic diagram of a power spectral density of a first measurement signal in Embodiment 1;

FIG. 7 is a schematic diagram of a power spectral density of a second measurement signal in Embodiment 1;

FIG. 8 is a schematic diagram of a power spectral density of a receiving signal in Embodiment 1;

FIG. 9 is a flowchart of the method for measuring a filtering characteristic of Embodiment 2;

FIG. 10 is a flowchart of an implementation of step 903 in Embodiment 2;

FIG. 11 is a flowchart of an implementation of step 904 in Embodiment 2;

Figure 12:
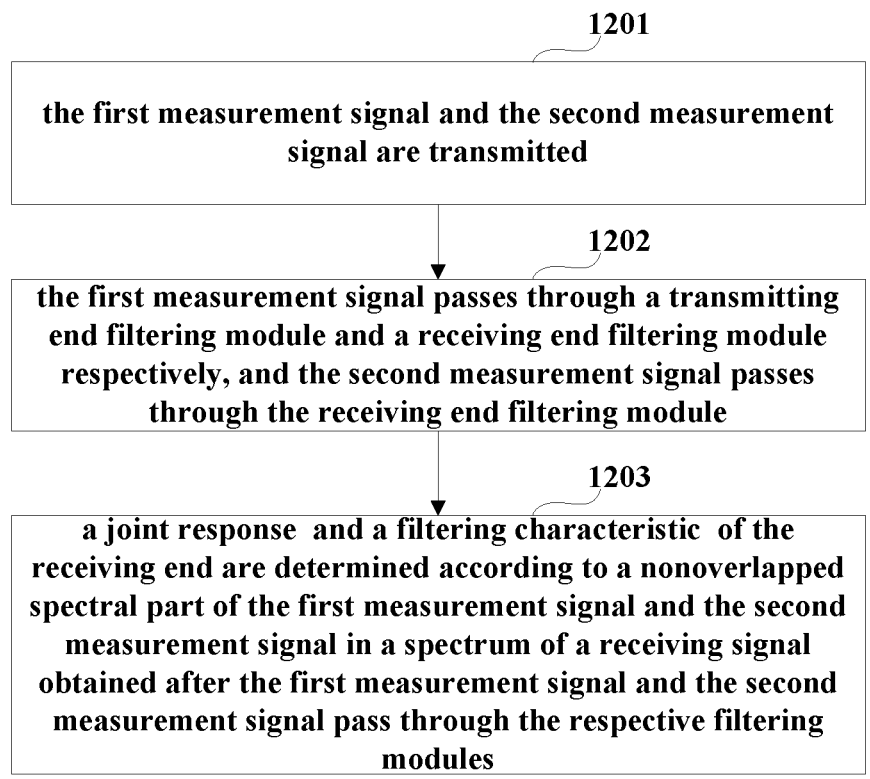
Figure 13:
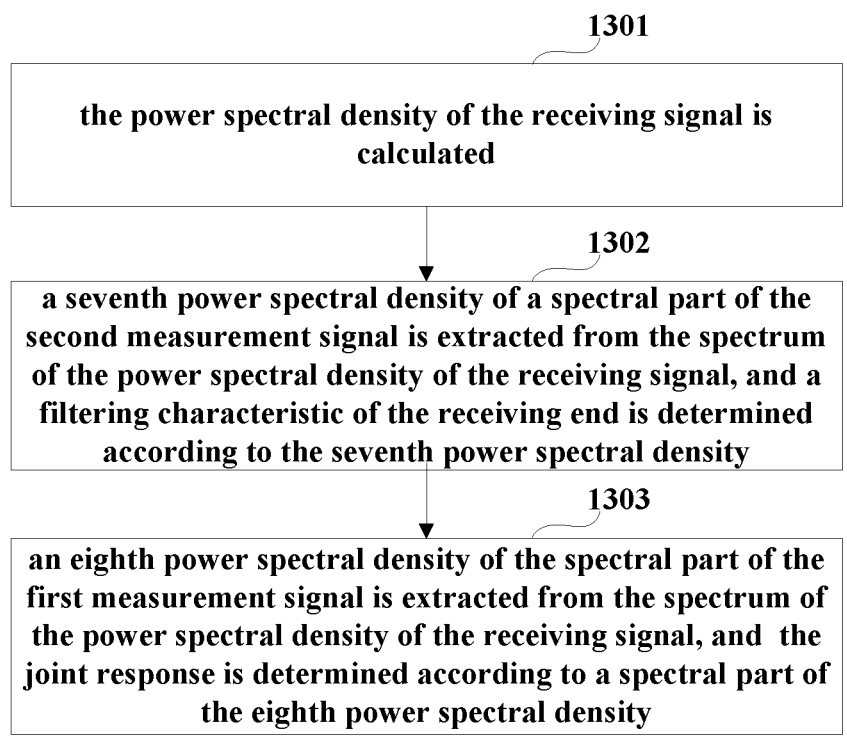
Figure 14:
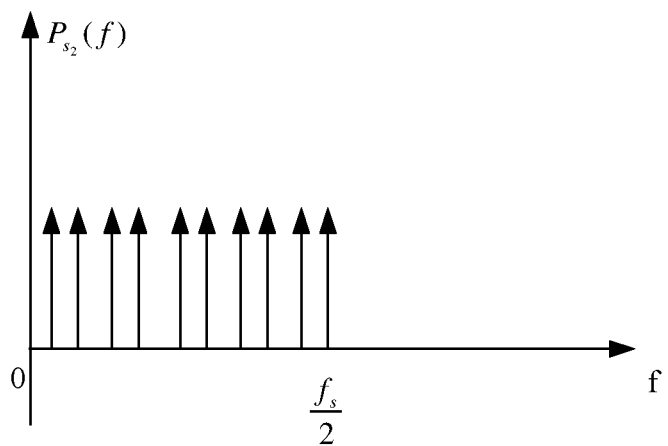
Figure 15:
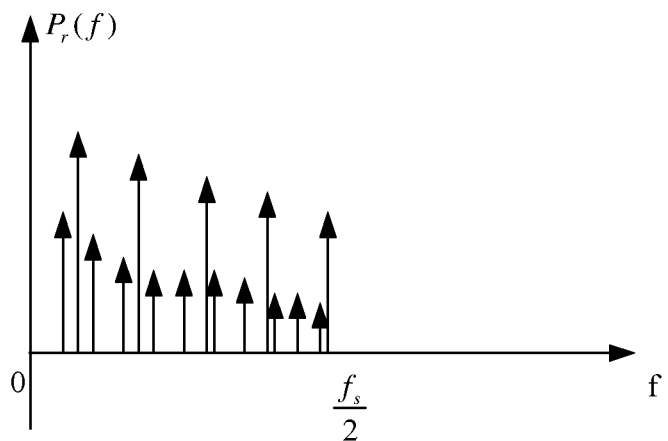
Figure 16:
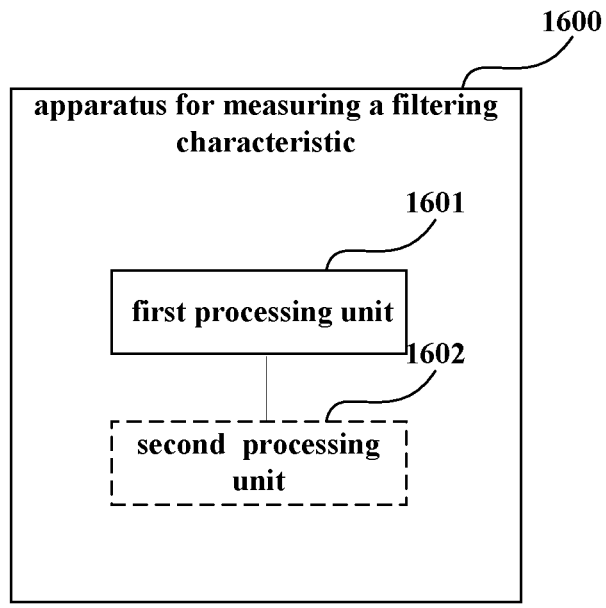
Figure 17:
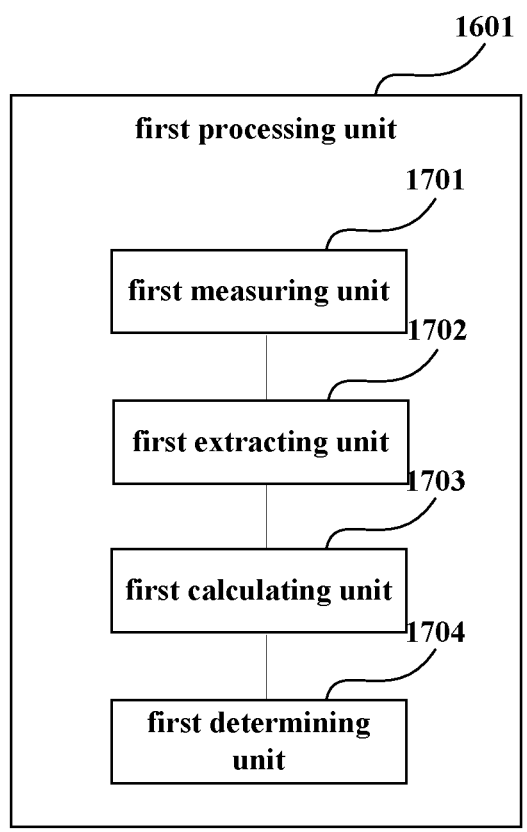
Figure 18:
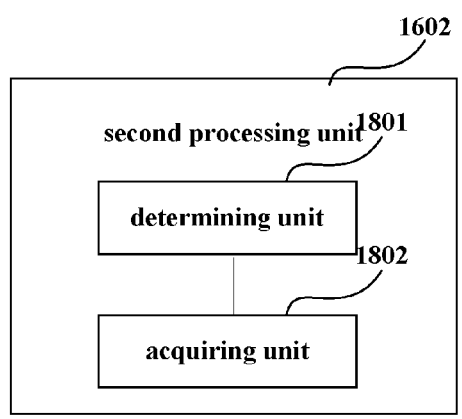
Figure 19:
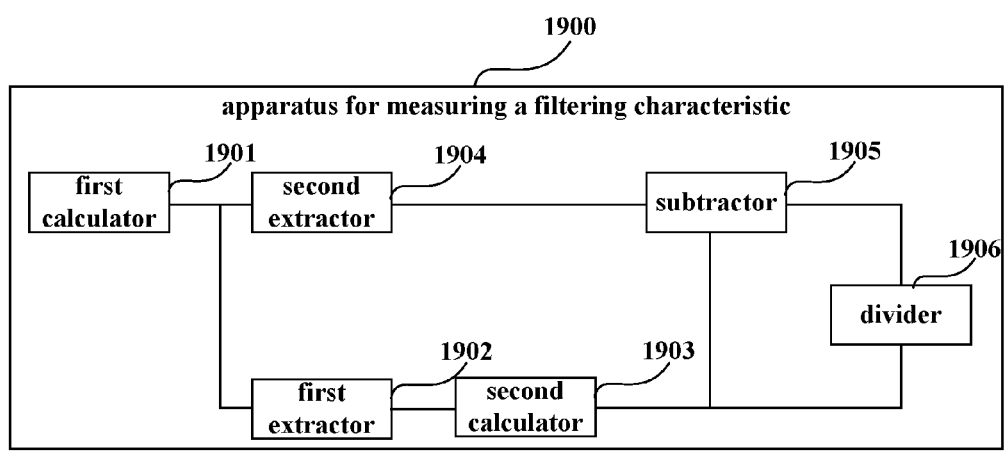
Figure 20:
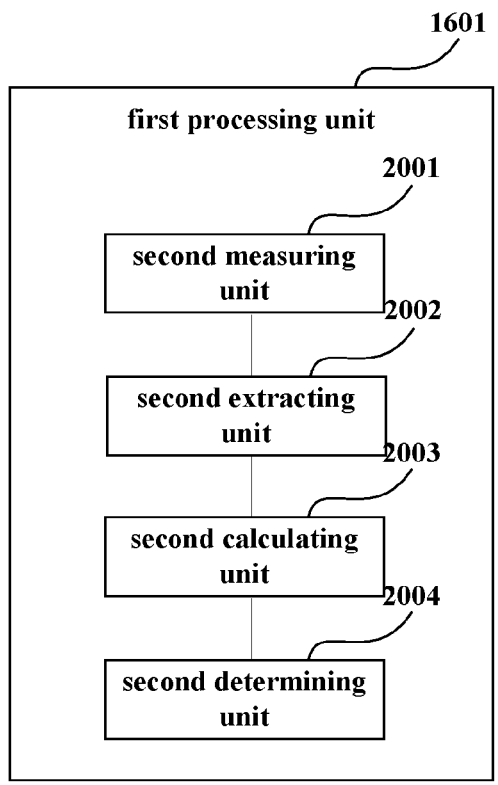
Figure 21:
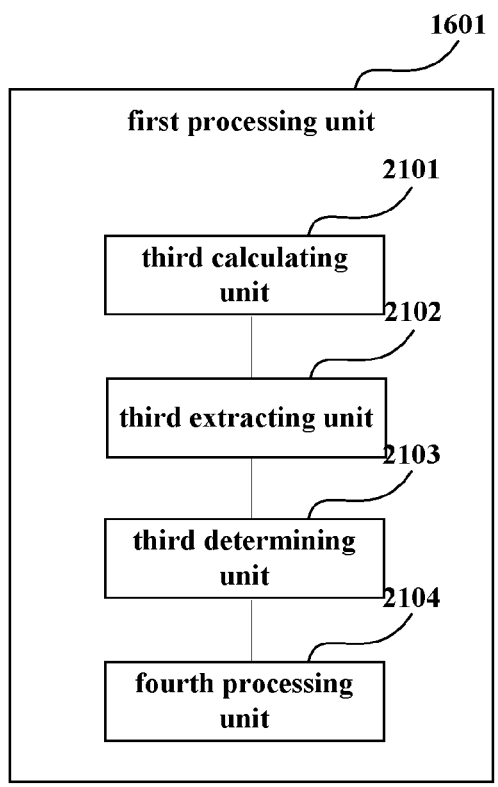
Figure 22:
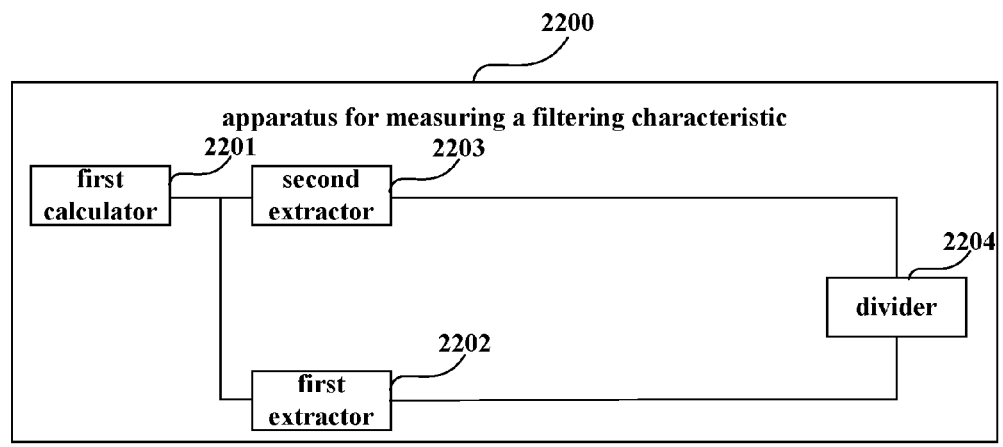
Figure 23:
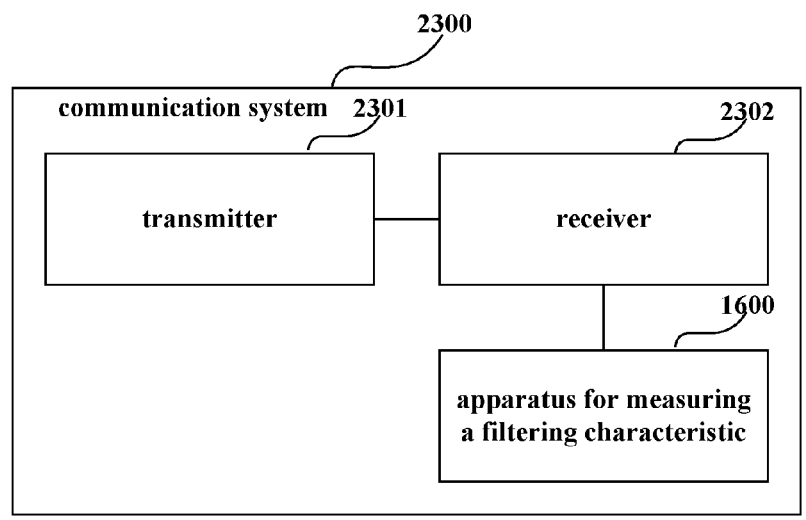
Figure 24:
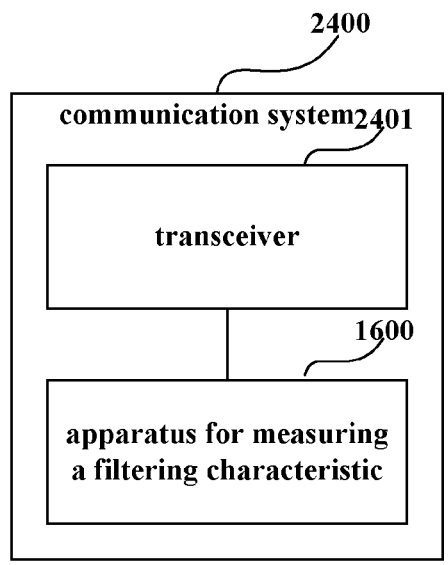
Figure 25:
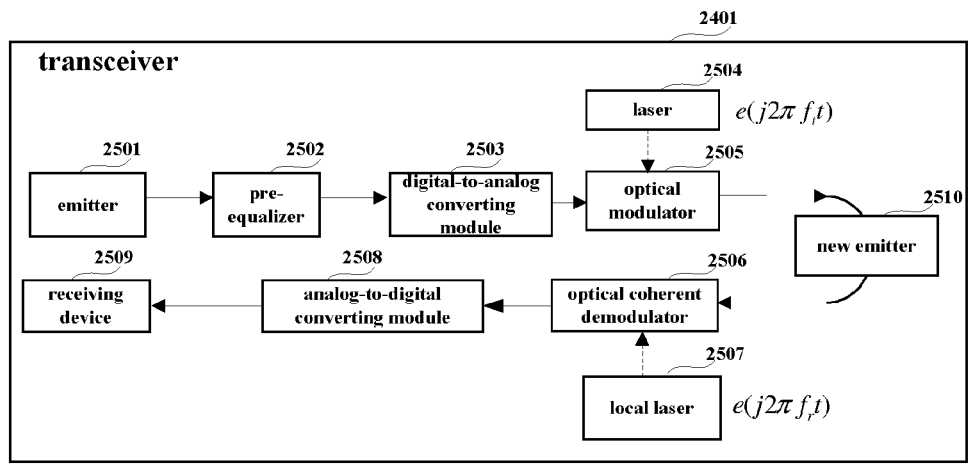
Figure 26:
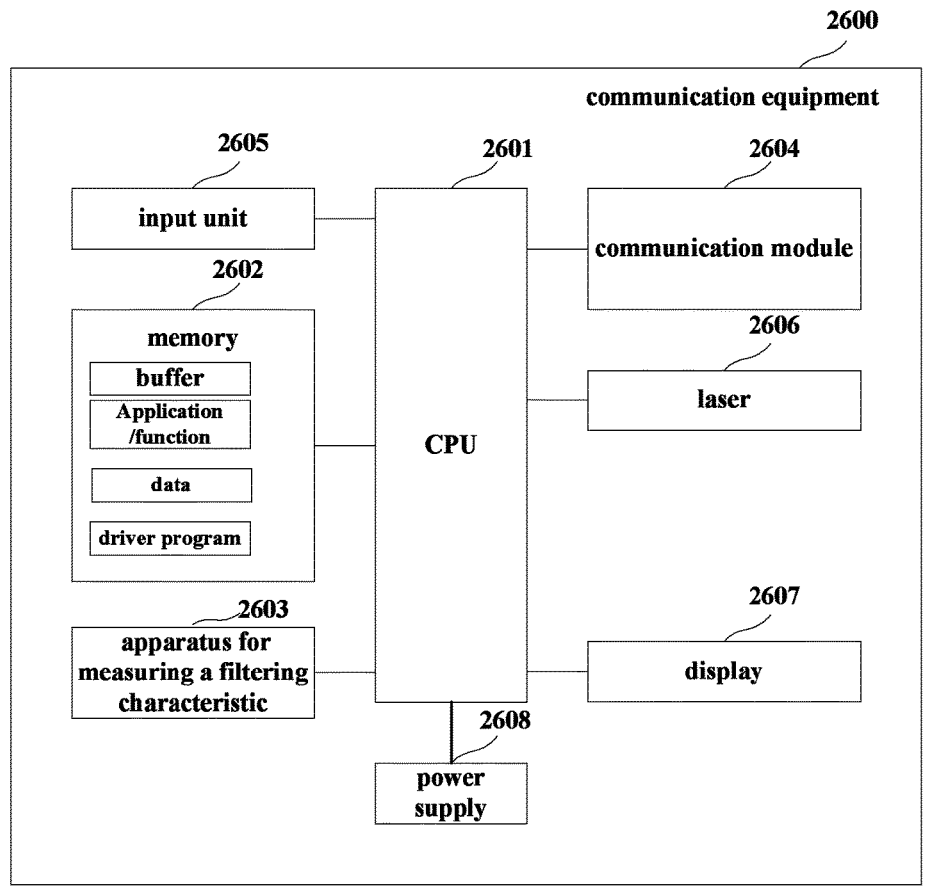
Figure 27:
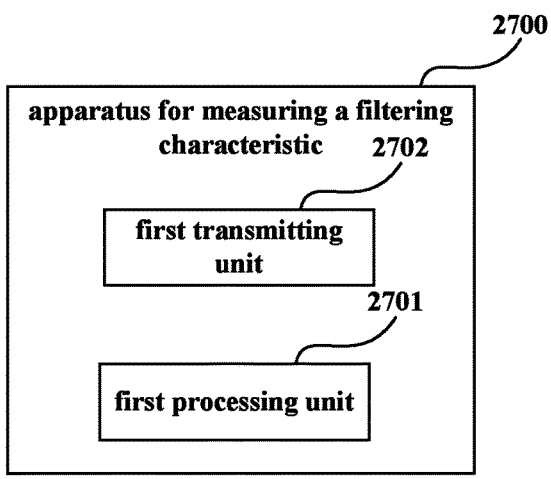
Figure 28:
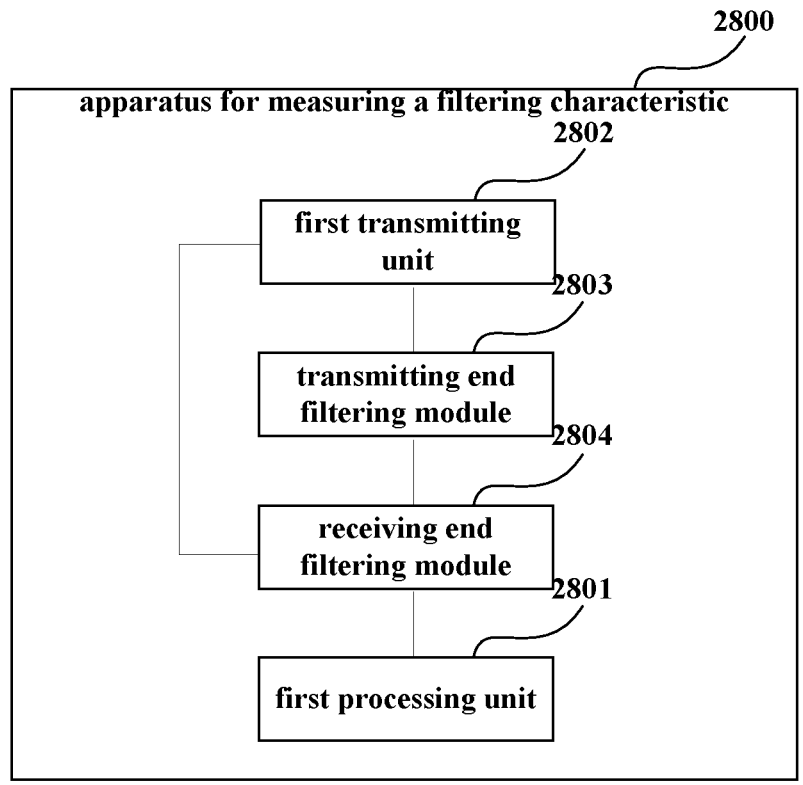
Figure 29:
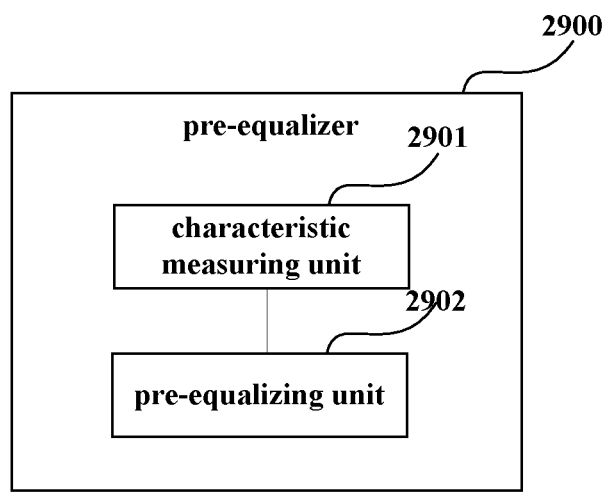

FIG. 12 is a flowchart of a method for measuring a filtering characteristic of Embodiment 3;

FIG. 13 is a flowchart of an implementation of step 1203 in Embodiment 3;

FIG. 14 is a schematic diagram of a power spectral density of a second measurement signal in Embodiment 3;

FIG. 15 is a schematic diagram of a power spectral density of a receiving signal in Embodiment 3;

FIG. 16 is a schematic diagram of an implementation of an apparatus for measuring a filtering characteristic in Embodiment 4;

FIG. 17 is a schematic diagram of an implementation of a first processing unit in Embodiment 4;

FIG. 18 is a schematic diagram of an implementation of a second processing unit in Embodiment 4;

FIG. 19 is a schematic diagram of an implementation of an apparatus for measuring a filtering characteristic in Embodiment 4;

FIG. 20 is a schematic diagram of an implementation of a first processing unit in Embodiment 5;

FIG. 21 is a schematic diagram of an implementation of a first processing unit in Embodiment 6;

FIG. 22 is a schematic diagram of an implementation of an apparatus for measuring a filtering characteristic in Embodiment 6;

FIG. 23 is a schematic diagram of an implementation of a communication system in Embodiment 7;

FIG. 24 is a schematic diagram of an implementation of a communication system in Embodiment 7;

FIG. 25 is a schematic diagram of a transceiver in Embodiment 7;

FIG. 26 is a schematic diagram of an implementation of communication equipment in Embodiment 8;

FIG. 27 is a schematic diagram of an implementation of an apparatus for measuring a filtering characteristic in Embodiment 9;

FIG. 28 is a schematic diagram of an implementation of an apparatus for measuring a filtering characteristic in Embodiment 10; and FIG. 29 is a schematic diagram of a pre-equalizer of Embodiment 11.

DETAILED DESCRIPTION

Reference will now be made in detail to the embodiments, examples of which are illustrated in the accompanying drawings, wherein like reference numerals refer to the like elements throughout. The embodiments are described below by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings.

In these embodiments, the filtering characteristic of the transmitting end refers to a filtering damage brought about by a filtering module of a transmitter or a filtering module of a transmitting end of a transceiver, which is denoted by $G(f)$; and the filtering characteristic of the receiving end refers to a filtering damage brought about by a filtering module of a receiver or a filtering module of a receiving end of a transceiver, which is denoted by $H(f)$.

In these embodiments, the joint response of the filtering characteristic of the transmitting end and the filtering characteristic of the receiving end refers to a joint filtering damage brought about by the filtering modules of the transmitter and the receiver, or a joint filtering damage brought about by the filtering modules of the transmitting end and the receiving end of the transceiver, which is denoted by $G(f)H(f)$.

In these embodiments, the filtering characteristics $G(f)$, $H(f)$ and $G(f)H(f)$ include amplitude frequency characteristics (shapes of the filtering characteristics) of the filtering modules; wherein, the corresponding amplitude frequency characteristics are denoted by $|G(f)|$, $|H(f)|$ and $|G(f)H(f)|$.

In the known art, instruments are often used to measure the filtering characteristic of the transmitting end or the receiving end, which is high in cost, and is hard in large-scale use. It was found by the inventors in the implementation of the present disclosure that nonoverlapped spectra of two measurement signals may be used to perform one time of measurement, so as to determine the filtering characteristic $H(f)$ of the receiving end or the joint response $G(f)H(f)$, and furthermore, to determine the filtering characteristic $G(f)$ of the transmitting end.

Hence, in order to solve the above problems, the embodiments provide a method and apparatus for measuring a filtering characteristic, pre-equalizer and optical communication equipment. The method includes: transmitting a first measurement signal and a second measurement signal; passing through a transmitting end filtering module and a receiving end filtering module by the first measurement signal, and passing through the receiving end filtering module by the second measurement signal; determining a filtering characteristic of the receiving end, or determining a joint response of the filtering characteristic of the transmitting end and the filtering characteristic of the receiving end, in a spectrum of a receiving signal obtained after the first measurement signal and the second measurement signal pass through respective filtering modules according to a nonoverlapped spectral part of the first measurement signal and the second measurement signal.

The apparatus includes:
a first processing unit configured to determine a filtering characteristic of a receiving end, or determine a joint response of a filtering characteristic of a transmitting end and a filtering characteristic of a receiving end, in a spectrum of a receiving signal obtained after a first measurement signal and a second measurement signal pass through respective filtering modules, according to a nonoverlapped spectral part of the first measurement signal and the second measurement signal;

wherein, the filtering modules through which the first measurement signal passes include a transmitting end filtering module and a receiving end filtering module, the filtering module through which the second measurement signal passes include the receiving end filtering module.

In this embodiment, spectral ranges of the first measurement signal and the second measurement signal are different, but it is permitted that they have an overlapped spectrum. And at least one of the first measurement signal and the second measurement signal is a discrete signal. For example, the first measurement signal and the second measurement signal are both discrete signals, or one of the first measurement signal and the second measurement signal is a discrete signal, and the other one is a continuous signal.

Following description shall be given taking that the first measurement signal and the second measurement signal are both discrete signals, and one of the first measurement signal and the second measurement signal is a discrete signal, and the other one is a continuous signal, as examples, respectively.

Embodiment 1

Embodiment 1 of the present disclosure provides a method for measuring a filtering characteristic. In this embodiment, a first measurement signal is a discrete signal, and a second measurement signal is a continuous signal.

Figure 3:
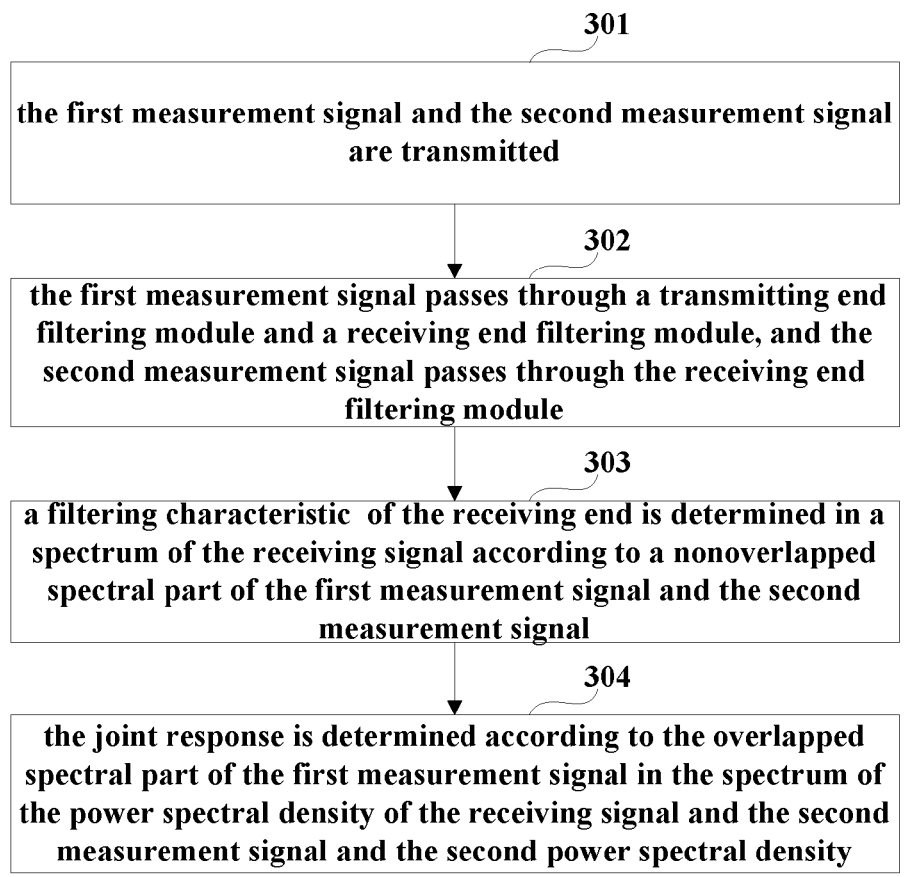

FIG. 3 is a flowchart of the method for measuring a filtering characteristic of Embodiment 1 of the present disclosure. Referring to FIG. 3, the method includes:

step 301: the first measurement signal and the second measurement signal are transmitted;

in this embodiment, the discrete signal is a frequency comb signal, and the continuous signal is a Gaussian white noise having a flat power spectral density (such as an amplified spontaneous emission (ASE) noise generated by an erbium-doped fiber amplifier). However, the continuous signal is not limited to the above signal, and may be any signals of known spectral shapes, such as a Nyquist pulse signal, etc.;

step 302: the first measurement signal passes through a transmitting end filtering module and a receiving end filtering module, and the second measurement signal passes through the receiving end filtering module;

in this embodiment, after the first measurement signal passes through the transmitting end filtering module, the second measurement signal is overlapped with the first measurement signal and passes through the receiving end filtering module; in this way, a signal passing through the receiving end filtering module may be obtained, and the signal obtained after passing through the receiving end filtering module is herein referred to as a receiving signal; and if the first measurement signal and the second measurement signal are denoted by $S_1(f)$ and $S_2(f)$ respectively, and the receiving signal is denoted by $R_1(f)$, the receiving signal is $$R_1(f)=S_1(f)G(f)H(f)+S_2(f)H(f);$$

step 303: a filtering characteristic H(f) of the receiving end is determined in a spectrum of the receiving signal according to a nonoverlapped spectral part of the first measurement signal and the second measurement signal;

in this embodiment, as the spectral ranges of the first measurement signal and the second measurement signal are different, overlapped first measurement signal and second measurement signal are easy to be separated, and nonoverlapped spectra may be used to determine H(f), the nonoverlapped spectral part is a whole spectrum of $S_2(f)H(f)$.

It can be seen from this embodiment that by making the first measurement signal and the second measurement signal of different spectral ranges pass through corresponding filtering modules, H(f) may be determined by using the nonoverlapped spectra of the first measurement signal and the second measurement signal, without measuring by using instruments, thereby avoiding the problems of high cost and uneasy large-scale use In this embodiment, in step 301, an emitter of a transmitter or a transceiver may be used to transmit the first measurement signal and the second measurement signal; in step 302, the transmitting end filtering module is a transmitting end filtering module of a transmitter or a transceiver of which a transmitting end filtering characteristic is to be measured, and the receiving end filtering module is a receiving end filtering module of a receiver or a transceiver of which a receiving end filtering characteristic is to be measured. Taking the transmitter shown in FIG. 1 as an example, when the receiving end filtering characteristic is measured, the pre-equalizer 102 of the transmitter 100 is disabled, and the emitter 101 transmits the first measurement signal to the digital-to-analog converting module 103, and transmits the second measurement signal to the optical coherent demodulator 201, respectively.

In this embodiment, in step 301, when the first measurement signal and the second measurement signal are transmitted, the original emitter of the transmitter or the transceiver is reused, and a specifically provided emitter may also be used to transmit the above first measurement signal or the second measurement signal. Then the first measurement signal is made to pass through the transmitting end filtering module and the receiving end filtering module, without passing through the pre-equalizer, and the second measurement signal is made to pass through the receiving end filtering module.

Step 303 shall be described below in detail with reference to the accompanying drawings.

Figure 4:
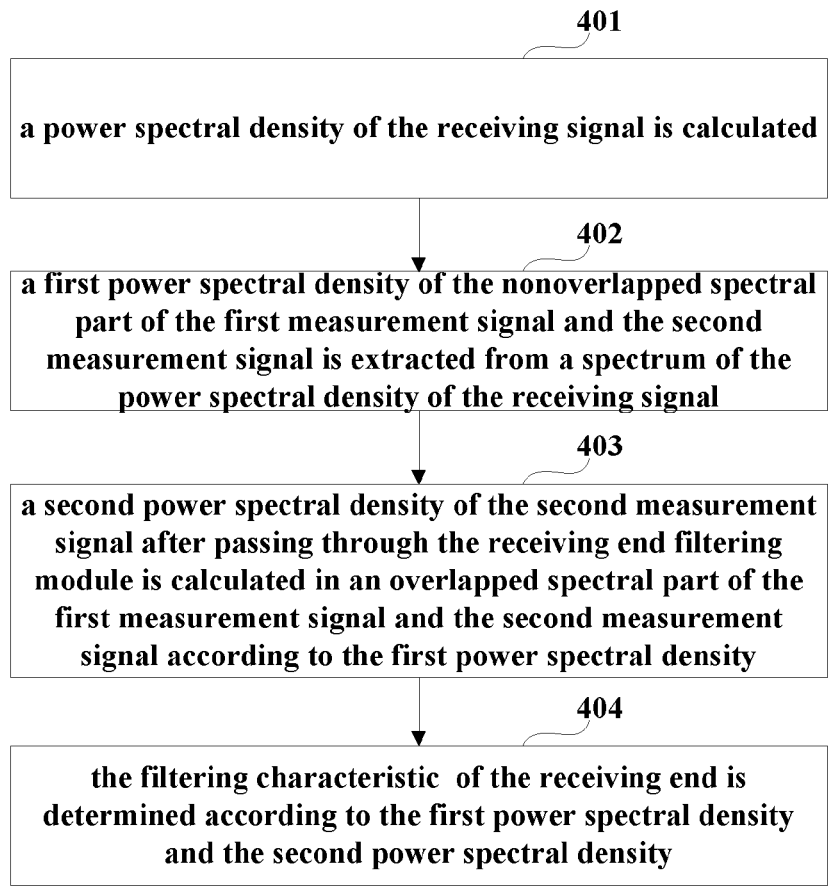

FIG. 4 is a flowchart of an implementation of step 303 in this embodiment. As shown in FIG. 4, step 303 includes:

step 401: a power spectral density of the receiving signal is calculated;

step 402: a first power spectral density of the nonoverlapped spectral part of the first measurement signal and the second measurement signal is extracted from a spectrum of the power spectral density of the receiving signal;

in this embodiment, as the first measurement signal is a discrete signal, and the second measurement signal is a continuous signal, the nonoverlapped spectral part of the first measurement signal and the second measurement signal is equivalent to the spectrum of the second measurement signal with the spectral part of a discrete frequency point $f_i$ of the first measurement signal (which is a frequency point needing to be measured of a filtering characteristic to be measured) being removed; and as the second measurement signal only passes through the receiving end filtering module, the first power spectral density is $N|H(f)|^2$ ($f \neq f_i$); where, N is a value of the power spectral density of the second measurement signal;

step 403: a second power spectral density of the second measurement signal after passing through the receiving end filtering module is calculated in an overlapped spectral part of the first measurement signal and the second measurement signal according to the first power spectral density;

in this embodiment, as the first measurement signal is a discrete signal, and the second measurement signal is a continuous signal, the overlapped spectral part of the first measurement signal and the second measurement signal is equivalent to a spectral part of the discrete frequency point $f_i$ of the first measurement signal, and the second power spectral density, i.e. $N|H(f)|^2$ ($f=f_i$), may be obtained by performing interpolation calculation according to the first power spectral density;

step 404: the filtering characteristic H(f) of the receiving end is determined according to the first power spectral density and the second power spectral density;

in this embodiment, $N|H(f)|^2$ of the receiving end in the whole spectral range is obtained by combining the first power spectral density and the second power spectral density, hence, the filtering characteristic $|H(f)|$ of the receiving end (an amplitude frequency characteristic) is obtained by extracting a root of $N|H(f)|^2$.

In this embodiment, alternatively, after the second power spectral density is obtained, as shown in FIG. 3, the method further includes step 304: the joint response G(f)H(f) is determined according to the overlapped spectral part of the first measurement signal in the spectrum of the power spectral density of the receiving signal and the second measurement signal and the second power spectral density.

Figure 5:
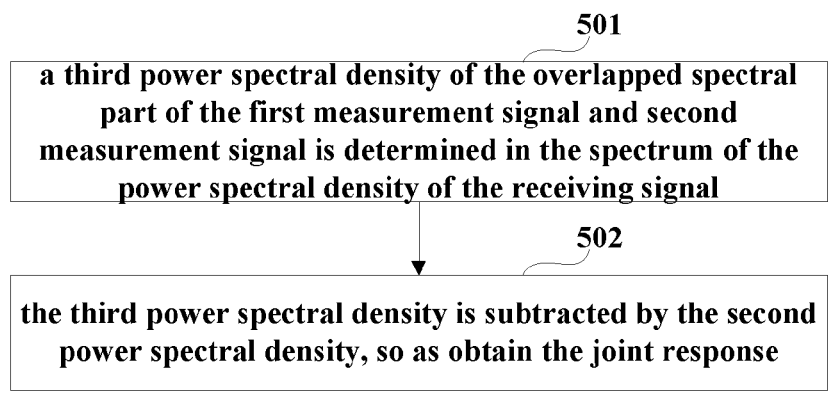

FIG. 5 is a flowchart of an implementation of step 304 in this embodiment. As shown in FIG. 5, step 304 includes:

step 501: a third power spectral density of the overlapped spectral part of the first measurement signal and second measurement signal is determined in the spectrum of the power spectral density of the receiving signal;

in this embodiment, the overlapped spectral part of the first measurement signal and the second measurement signal is equivalent to the spectral part of the discrete frequency point $f_i$ of the first measurement signal, and as the first measurement signal passes through the transmitting end filtering module and the receiving end filtering module and the second measurement signal passes through the same receiving end filtering module, in the spectrum of the receiving signal, the third power spectral density of the overlapped spectral part of the first measurement signal and second measurement signal contains two parts, $N|H(f_i)|^2$ and $|A_iG(f_i)H(f_i)|^2$; where, A is an amplitude of the first measurement signal at an i-th discrete frequency point, which may be a complex number, or a real number;

step 502: the third power spectral density is subtracted by the second power spectral density, so as to obtain $|A_iG(f_i)H(f_i)|^2$, hence obtaining the joint response $|G(f)H(f)|$;

in this embodiment, the third power spectral density may be subtracted by the second power spectral density, so as to obtain $|A_iG(f_i)H(f_i)|^2$, and when $f_i$ covers the whole measurement frequency points, a joint response (an amplitude frequency characteristic) at frequency points needing to be measured may be obtained after a root is extracted.

In this embodiment, as relative responses of the frequency points are important, when amplitudes of $A_i$ are equal at the discrete frequency points of the first measurement signal and the power spectral density N of the second measurement signal is flat, amplitudes of the first measurement signal and the second measurement signal need not to be learnt; and furthermore, even if the amplitudes of $A_i$ are unequal at the discrete frequency points of the first measurement signal or the power spectral density N of the second measurement signal is not flat, as the amplitude $A_i$ and N are known, $A_i$ and N are easy to be removed after extracting roots of $N|H(f)|^2$ and $|A_iG(f)H(f)|^2$, hence obtaining the filtering characteristics $|H(f)|$ of the receiving end and the joint response $|G(f)H(f)|$ at the frequency points needing to be measured.

In this embodiment, alternatively, the method further includes the following step (not shown):

determining the filtering characteristic $|G(f)|$ of the transmitting end according to the joint response $|G(f)H(f)|$ and the filtering characteristic $|H(f)|$ of the receiving end, that is, obtaining $$\frac{A_i^2}{N}|G(f_i)|^2$$

by dividing $|A_iG(f_i)H(f_i)|^2$ by $N|H(f_i)|^2$, and extracting a root of $$\frac{A_i^2}{N}|G(f_i)|^2,$$

so as to obtain the filtering characteristic (an amplitude frequency characteristic) $|G(f)|$ of the transmitting end at the frequency points needing to be measured.

In this embodiment, in measuring the respective filtering characteristics of the transmitter, the receiver or the transceiver, a transmitter laser and a local laser may be set to be having identical frequencies, or may be set to be of different frequencies, and this embodiment is not limited thereto. For example, when there exists a frequency offset $\Delta f$ (a first frequency) between the transmitter laser and the local laser, the corresponding $H(f_i)$ is corrected to be $H(f_i+\Delta f)$; wherein, $\Delta f$ may be determined according to frequency offsets of the discrete frequency points of the first measurement signal in the receiving signal, and when $f_i+\Delta f \leq f_s/2$ (where, $f_s$ is a sampling frequency of a digital-to-analog converting module), the frequency offset has no effect on the measurement of $G(f_i)$.

Figure 6:
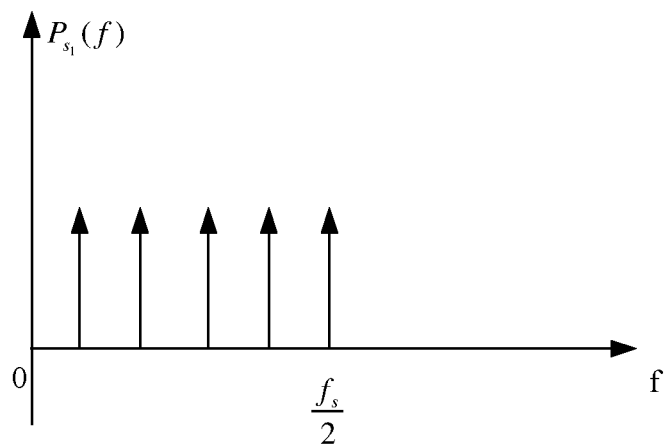
Figure 7:
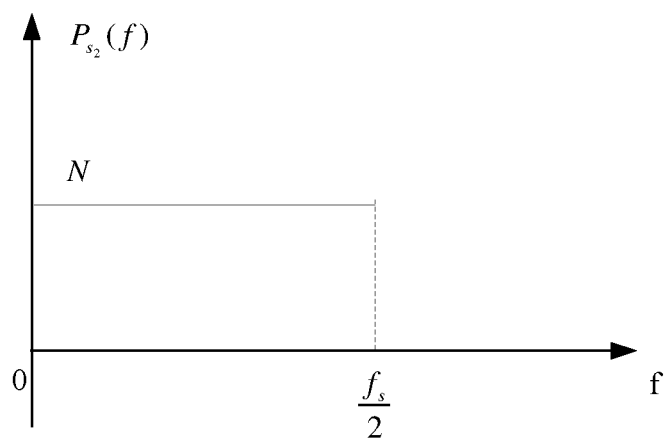
Figure 8:
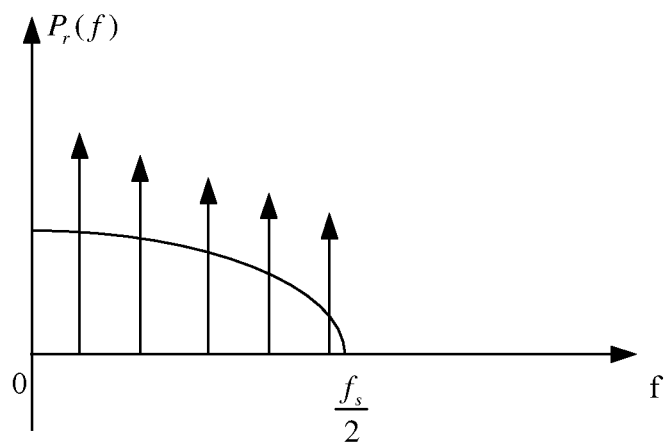

FIG. 6 is a schematic diagram of the power spectral density of the first measurement signal in this embodiment, FIG. 7 is a schematic diagram of the power spectral density of the second measurement signal in this embodiment, and FIG. 8 is a schematic diagram of the power spectral density of the receiving signal. How to determine the filtering characteristics of the receiving end and the transmitting end shall be described below with reference to FIGS. 6-8.

In this embodiment, as shown in FIG. 6, the first measurement signal is frequency comb signal, $S_1(f)=\Sigma_{f_i \in FI} A_i \delta(f-f_i)$; where, $f_i$ is a frequency of an i-th component of the frequency comb, a spectral range of its power spectral density being $$0 \leq f_i \leq \frac{f_s}{2},$$

and $f_s$ is the sampling frequency of the digital-to-analog converting module. For example, the number and distribution of $f_i$ are dependent on needed measurement frequency points, and in order to facilitate detection of the frequency comb by the receiving end, an amplitude of the i-th component may be set to be $A_i$, which may be a complex number, or a real number, and amplitudes of each component may be identical or different.

In this embodiment, as shown in FIG. 7, the second measurement signal is an ASE noise having a flat power spectrum. FIG. 7 is a schematic diagram of the power spectral density of the second measurement signal, and its power spectral density is N.

In this embodiment, as shown in FIG. 8, the receiving signal is obtained after the first measurement signal and the second measurement signal pass through respective filtering modules. For example, a first power spectral density $N|H(f)|^2(f \neq f_i)$ of the power spectral density of the receiving signal except the frequency comb of the first measurement signal (the nonoverlapped spectral part of the first measurement signal and the second measurement signal) is extracted, and a second power spectral density $N|H(f_i)|^2$ of the noise at a frequency of the frequency comb (the overlapped spectral part of the first measurement signal and the second measurement signal) is calculated by interpolation and a root thereof is extracted, thereby obtaining the filtering characteristic $|H(f_i)|$ of the receiving end at all frequency points (including the measurement frequency points).

In this embodiment, the third power spectral density $N|H(f_i)|^2+|A_iG(f_i)H(f_i)|^2$ of the power spectral density of the receiving signal at the frequency comb of the first measurement signal (the overlapped spectral part of the first measurement signal and the second measurement signal) is extracted and subtracted by the second power spectral density) $N|H(F_i)|^2$, so as to obtain $|A_iG(f_i)H(f_i)|^2$, a root of which is extracted, so as to obtain the joint response $|G(f_i)H(f_i)|$ at the measurement frequency point, and $$\frac{A_i^2}{N}|G(f_i)|^2$$

is obtained by dividing $|A_iG(f_i)H(f_i)|^2$ by $N|H(f_i)|^2$; as relative responses of the frequency points are important, when $$\frac{A_i^2}{N}$$

is a constant, the filtering characteristic $|G(f_i)|$ of the transmitting end at the measurement frequency point may be obtained, without needing to learn $A_i$ and N; and when $$\frac{A_i^2}{N}$$

is not a constant, as $A_i$ and N are known, $|G(f_i)|$ is easy to be obtained.

In this embodiment, alternatively, when the emitter and filtering modules of the transmitter, the receiver or the transceiver are used in steps 301 and 302, the method may further include: setting the pre-equalizer of the transmitter or the transceiver, so as to disable the pre-equalizer.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

Embodiment 2

Embodiment 2 of the present disclosure provides a method for measuring a filtering characteristic. In this embodiment, what differs from Embodiment 1 is that the first measurement signal is a continuous signal, and the second measurement signal is a discrete signal.

Figure 9:
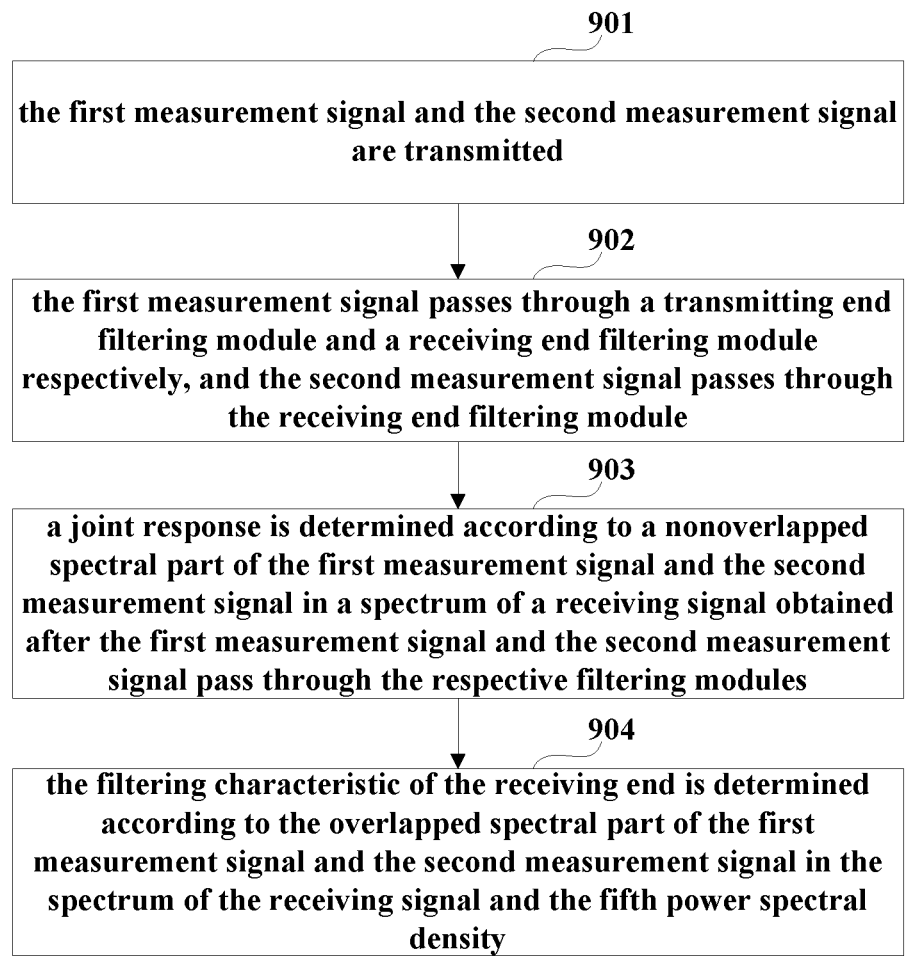

FIG. 9 is a flowchart of the method for measuring a filtering characteristic of Embodiment 2 of the present disclosure. Referring to FIG. 9, the method includes:
  step 901: the first measurement signal and the second measurement signal are transmitted;
  step 902: the first measurement signal passes through a transmitting end filtering module and a receiving end filtering module respectively, and the second measurement signal passes through the receiving end filtering module; and
  step 903: a joint response is determined according to a nonoverlapped spectral part of the first measurement signal and the second measurement signal in a spectrum of a receiving signal obtained after the first measurement signal and the second measurement signal pass through the respective filtering modules.

In this embodiment, particular implementations of steps 901 and 902 are the same as those of Embodiment 1, and shall not be described herein any further; and in step 903, in the receiving signal, the nonoverlapped spectral part is all spectra of $S_1(f)$ G(f) H(f), hence, G(f)H(f) may be determined according to the nonoverlapped spectral part.

It can be seen from this embodiment that without changing parameters of the system, the joint response G(f)H(f) may be determined by using two measurement signals and the transmitter and the receiver themselves, with no need of use of extra instrument, thereby avoiding the problems of high cost and uneasy large-scale use brought about by measurement of filtering characteristic by using instruments.

In this embodiment, alternatively, when the emitter and filtering modules of the transmitter, the receiver or the transceiver are used, the method may further include: setting the pre-equalizer of the transmitter or the transceiver, so as to disable the pre-equalizer.

Figure 10:
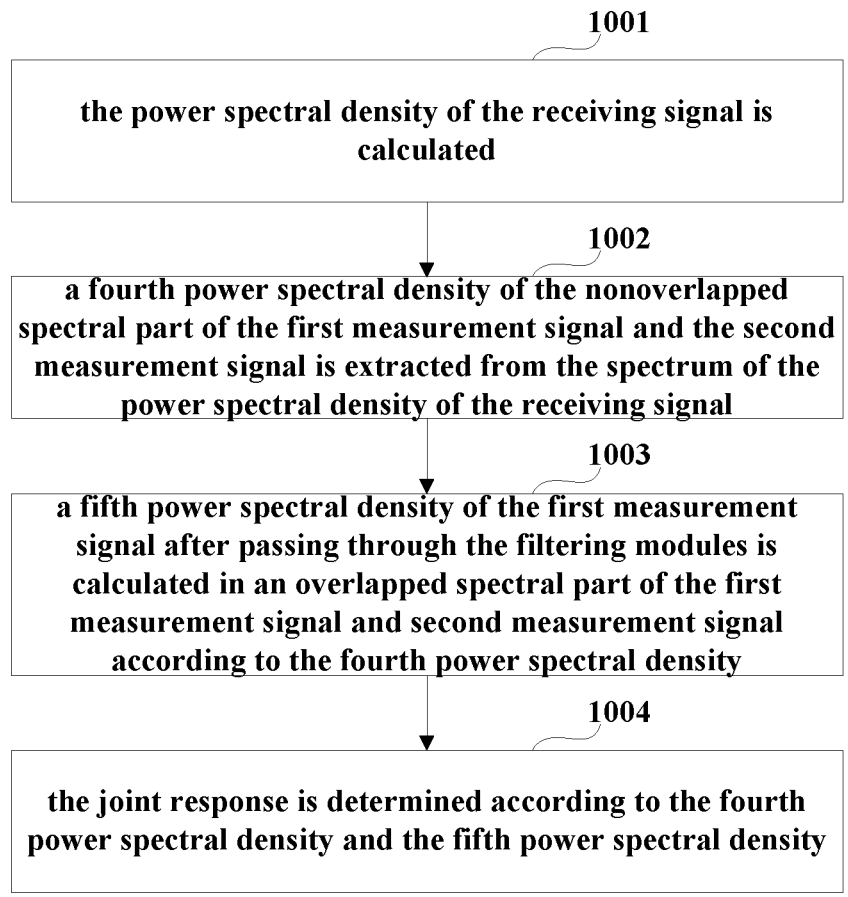

FIG. 10 is a flowchart of an implementation of step 903 in this embodiment. As shown in FIG. 10, step 903 includes:
  step 1001: the power spectral density of the receiving signal is calculated;
  step 1002: a fourth power spectral density of the nonoverlapped spectral part of the first measurement signal and the second measurement signal is extracted from the spectrum of the power spectral density of the receiving signal;
  in this embodiment, in step 1002, as the first measurement signal is a continuous signal and the second measurement signal is a discrete signal, the nonoverlapped spectral part of the first measurement signal and the second measurement signal corresponds to the spectrum of the first measurement signal with the spectral part of the discrete frequency point $f_i$ of the second measurement signal being removed; and as the first measurement signal passes through the filtering modules of the transmitting end and the receiving end, the fourth power spectral density is $N|G(f)H(f)|^2$ ($f \neq f_i$); where, N is a value of the power spectral density of the first measurement signal;
  step 1003: a fifth power spectral density of the first measurement signal after passing through the filtering modules is calculated in an overlapped spectral part of the first measurement signal and second measurement signal according to the fourth power spectral density;
  in this embodiment, as the first measurement signal is a continuous signal and the second measurement signal is a discrete signal, the overlapped spectral part of the first measurement signal and the second measurement signal corresponds to the spectral part of the discrete frequency point $f_i$ of the second measurement signal, and the fifth power spectral density is obtained by performing interpolation calculation according to the obtained fourth power spectral density, that is, $N|G(f)H(f)|^2$ ($f=f_i$);
  step 1004: the joint response is determined according to the fourth power spectral density and the fifth power spectral density;
  in this embodiment, $N|G(f)H(f)|^2$ of the receiving end in the whole spectral range is obtained by combining the fourth power spectral density and the fifth power spectral density, hence obtaining $|G(f)H(f)|$.

In this embodiment, alternatively, after the fifth power spectral density is obtained, as shown in FIG. 9, the method may further include: step 904: the filtering characteristic of the receiving end is determined according to the overlapped spectral part of the first measurement signal and the second measurement signal in the spectrum of the receiving signal and the fifth power spectral density.

Figure 11:
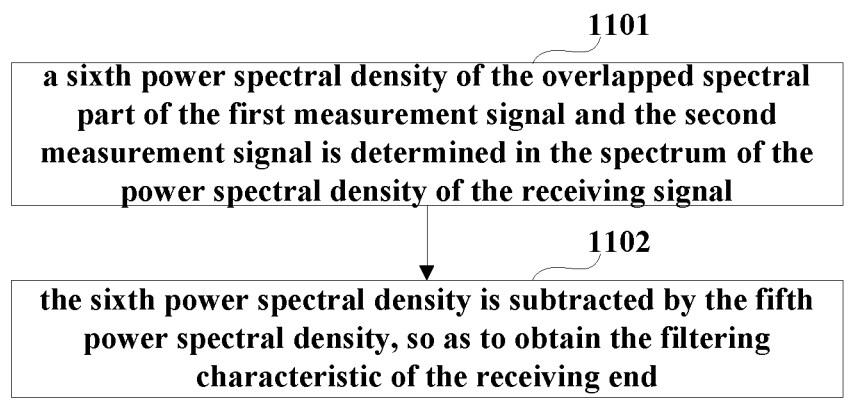

FIG. 11 is a flowchart of an implementation of step 904 in this embodiment. As shown in FIG. 11, step 904 includes:
  step 1101: a sixth power spectral density of the overlapped spectral part of the first measurement signal and the second measurement signal is determined in the spectrum of the power spectral density of the receiving signal; and
  step 1102: the sixth power spectral density is subtracted by the fifth power spectral density, so as to obtain the filtering characteristic of the receiving end.

In this embodiment, in step 1101, as the first measurement signal is a continuous signal and the second measurement signal is a discrete signal, the overlapped spectral part of the first measurement signal and the second measurement signal corresponds to the spectral part of the discrete frequency point $f_i$ of the second measurement signal; and as the first measurement signal passes through the filtering modules of the transmitting end and the filtering modules of the receiving end at the same time and the second measurement signal passes through the filtering modules of the receiving end only, the fifth power spectral density of the overlapped spectral part of the first measurement signal and the second measurement signal in the spectrum of the receiving signal contains two parts, $|A_i H(f_i)|^2$ and $N|G(f_i)H(f_i)|^2$; where, $A_i$ is the amplitude of the second measurement signal at the i-th discrete frequency point, which may be a complex number, or a real number.

In this embodiment, in step 1102, the sixth power spectral density is subtracted by the fifth power spectral density, so as to obtain $|A_i H(f_i)|^2$, hence obtaining the filtering characteristic $|H(f_i)|$ of the receiving end at each frequency point needing to be measured when $f_i$ covers all the measurement frequency points.

In this embodiment, the method may further include: determining the filtering characteristic of the transmitting end according to the joint response and the filtering characteristic of the receiving end; wherein, Embodiment 1 may be referred to for a particular implementation, which shall not be described herein any further.

In this embodiment, as only relative responses of the frequency points are important, amplitudes of the first measurement signal and the second measurement signal need not to be learnt, and even if the power spectral density of the first measurement signal is not flat or the amplitudes at the discrete frequency points of the second measurement signal are not equal, as the power spectral density of the first measurement signal and amplitudes of components are known, it is easy to obtain the filtering characteristic $|G(f)|$ of the transmitting end at each frequency point needing to be measured.

In this embodiment, for example, in measuring the filtering characteristics of the transmitter and receiver or the transceiver, a transmitter laser and a local laser are set to be having identical frequencies; however, this embodiment is not limited thereto. For example, when there exists a frequency offset $\Delta f$ between the transmitter laser and the local laser, the corresponding $H(f_i)$ is corrected to be $H(f_i+\Delta f)$; wherein, $\Delta f$ may be determined according to a frequency offset of a discrete frequency point of the first measurement signal in the receiving signal, and when $f_i+\Delta f \leq f_s/2$ (where, $f_s$ is a sampling frequency of a digital-to-analog converting module), the frequency offset has no effect on the measurement of $G(f_i)$.

How to determine the filtering characteristics of the receiving end and the transmitting end shall be described by way of examples. Referring to FIGS. 6-8, wherein, what differ from Embodiment 1 are that FIG. 6 is a schematic diagram of the power spectral density of the second measurement signal and FIG. 7 is a schematic diagram of the power spectral density of the first measurement signal, that is, the second measurement signal is a frequency comb signal $S_2(f)=\Sigma_{f_i=F1} A_i \delta(f-f_i)$; where, $f_i$ is a frequency of an i-th component of the frequency comb, $$-\frac{f_s}{2} \leq f_i \leq \frac{f_s}{2},$$

$f_s$ being the sampling frequency of the digital-to-analog converting module; wherein, the number and distribution of $f_i$ are dependent on needed measurement frequency points, and in order to facilitate detection of the frequency comb by the receiving end, an amplitude of the i-th component may be set to be $A_i$, which may be a complex number, or a real number, and amplitudes of each component may be identical or different; and the first measurement signal is an ASE noise having a flat power spectrum, and its power spectral density is N.

In this embodiment, as shown in FIG. 8, the receiving signal is obtained after the first measurement signal and the second measurement signal pass through respective filtering modules. For example, a fourth power spectral density $N|G(f)H(f)|^2 (f \neq f_i)$ of the power spectral density of the receiving signal except the frequency comb of the second measurement signal (the nonoverlapped spectral part of the first measurement signal and the second measurement signal) is extracted, and a fifth power spectral density $N|G(f_i)H(f_i)|^2$ of the noise at a frequency of the frequency comb (the overlapped spectral part of the first measurement signal and the second measurement signal) is calculated by interpolation and a root thereof is extracted, thereby obtaining the filtering characteristic $|G(f)H(f)|$ of the joint response at the whole frequency range (including the measurement frequency points).

In this embodiment, the sixth power spectral density $|A_i H(f_i)|^2 + N|G(f_i)H(f_i)|^2$ of the power spectral density of the receiving signal at the frequency comb of the second measurement signal (the overlapped spectral part of the first measurement signal and the second measurement signal) is extracted and subtracted by the fifth power spectral density $N|G(f_i)H(f_i)|^2$, so as to obtain $|A_i H(f_i)|^2$, hence the filtering characteristic $|H(f_i)|$ of the receiving end at the measurement frequency point is obtained, and $$\frac{N}{A_i^2}|G(f_i)|^2$$

is obtained by dividing $N|G(f_i)H(f_i)|^2$ by $|A_i H(f_i)|^2$; as relative responses of the frequency points are important, when $$\frac{N}{A_i^2}$$

is a constant, the filtering characteristic $|G(f_i)|$ of the transmitting end at the measurement frequency point may be obtained, without needing to learn $A_i$ and N; and when $$\frac{N}{A_i^2}$$

is not a constant, as $A_1$ and N are known, $|G(f_i)|$ is easy to be obtained.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

Embodiment 3

Embodiment 3 of the present disclosure provides a method for measuring a filtering characteristic. In this embodiment, what differs from embodiments 1 and 2 is that the first measurement signal is a discrete signal, and the second measurement signal is a discrete signal.

FIG. 12 is a flowchart of the method for measuring a filtering characteristic of Embodiment 3 of the present disclosure. Referring to FIG. 12, the method includes:

step 1201: the first measurement signal and the second measurement signal are transmitted;

step 1202: the first measurement signal passes through a transmitting end filtering module and a receiving end filtering module respectively, and the second measurement signal passes through the receiving end filtering module; and step 1203: a joint response G(f)H(f) and a filtering characteristic H(f) of the receiving end are determined according to a nonoverlapped spectral part of the first measurement signal and the second measurement signal in a spectrum of a receiving signal obtained after the first measurement signal and the second measurement signal pass through the respective filtering modules.

In this embodiment, particular implementations of steps 1201 and 1202 are the same as those of embodiments 1 and 2, and shall not be described herein any further; and in step 1203, in the receiving signal, as both the first measurement signal and the second measurement signal are discrete signals and their spectra are not overlapped, G(f)H(f) and H(f) may be determined according to the nonoverlapped spectral part.

In this embodiment, alternatively, when emitters and filtering modules of the transmitter, the receiver or the transceiver are used, the method may further include: setting a pre-equalizer of the transmitter or the transceiver, so as to disable the pre-equalizer.

FIG. 13 is a flowchart of an implementation of step 1203 in this embodiment. As shown in FIG. 13, step 1203 includes:

step 1301: the power spectral density of the receiving signal is calculated;

step 1302: a seventh power spectral density of a spectral part of the second measurement signal is extracted from the spectrum of the power spectral density of the receiving signal, and a filtering characteristic of the receiving end is determined according to the seventh power spectral density;

step 1303: an eighth power spectral density of the spectral part of the first measurement signal is extracted from the spectrum of the power spectral density of the receiving signal, and the joint response is determined according to a spectral part of the eighth power spectral density.

In this embodiment, in steps 1302 and 1303, as both the first measurement signal and the second measurement signal are discrete signals and their spectra are different, they may be easily differentiated in the power spectral density of the receiving signal. And as the first measurement signal passes through the filtering modules of the transmitting end and the receiving end, the eighth power spectral density is $|A_iG(f)H(f)|^2$ ($f=f_i$), and hence the joint response at the measurement frequency point $f_i$ is obtained; and the seventh power spectral density is $|B_jH(f)|^2$ ($f=f_j$) and a root of which is extracted, so as to obtain the filtering characteristic of the receiving end at the measurement frequency point $f_j$, $f_j$ being different from $f_i$; where, $A_i$ is an amplitude of the first measurement signal at an i-th discrete frequency point, and $B_j$ is an amplitude of the second measurement signal at a j-th discrete frequency point.

In this embodiment, the method may further include: determining the filtering characteristic of the transmitting end according to the joint response and the filtering characteristic of the receiving end; that is, calculating $|B_iH(f_i)|^2$ through interpolation based on $|B_jH(f_j)|^2$, obtaining $$\frac{A_i^2}{B_i^2}|G(f_i)|^2$$

by dividing $|A_iG(f_i)H(f_i)|^2$ by $|B_iH(f_i)|^2$, hence obtaining the filtering characteristic $|G(f)|$ of the transmitting end at the frequency points needing to be measured.

In this embodiment, as only relative responses of the frequency points are important, amplitudes of the first measurement signal and the second measurement signal need not to be learnt. However, in order to separate the respective spectra of the first measurement signal and the second measurement signal at the receiving end easier, the amplitudes of the first measurement signal and the second measurement signal may be set to be different.

In this embodiment, for example, in measuring the filtering characteristics of the transmitter and receiver or the transceiver, a transmitter laser and a local laser may be set to be having any frequencies; however, this embodiment is not limited thereto.

How to determine the filtering characteristics of the receiving end and the transmitting end shall be described by way of examples.

In this embodiment, what differs from Embodiment 1 is that FIG. 7 is a schematic diagram of the power spectral density of the first measurement signal, that is, the first measurement signal is a frequency comb signal $S_1(f)$ $\Sigma_{f_i \in F_1} A_i \delta(f-f_i)$, a particular implementation of which being identical to that in Embodiment 1, and being not going to be described herein any further. FIG. 14 is a schematic diagram of the power spectral density of the second measurement signal, and FIG. 15 is a schematic diagram of the power spectral density of the receiving signal. For example, the second measurement signal is $S_2(f)=\Sigma_{f_j \in F_1} B_j \delta(f-f_j)$; where, $f_j$ is a frequency of an j-th component of the frequency comb, $$-\frac{f_s}{2} \le f_j \le \frac{f_s}{2},$$

$f_s$ being the sampling frequency of the digital-to-analog converting module; wherein, the number and distribution of $f_j$ are dependent on needed measurement frequency points, and in order to facilitate detection of the frequency comb by the receiving end, an amplitude of the j-th component may be set to be $B_j$, which may be a complex number, or a real number, and amplitudes of components may be identical or different.

In this embodiment, as shown in FIG. 15, the receiving signal is obtained after the first measurement signal and the second measurement signal pass through respective filtering modules. For example, the eighth power spectral density $|A_iG(f_i-\Delta f_1)H(f_i)|^2$ of the power spectral density of the receiving signal at the frequency comb of the first measurement signal is extracted, and a frequency offset $\Delta f_1$ (a first frequency) of the frequency comb of the first measurement signal is obtained through observation; the eighth power spectral density is translated by $\Delta f_1$, so as to obtain $|A_iG(f_i)H(f_i+\Delta f_1)|^2$, hence determining the joint response $|G(f)H(f)|$ at the measurement frequency point; the seventh power spectral density $|B_jH(f_j+\Delta f_2)|^2$ of the power spectral density of the receiving signal at the frequency comb of the second measurement signal is extracted, hence determining the filtering characteristic $|H(f_i)|$ of the receiving end at the measurement frequency point; where, $\Delta f_2$ (a second frequency) is the frequency offset of the frequency comb of the second measurement signal; and $|B_jH(f_i+\Delta f_1)|^2$ with the frequency offset $\Delta f_1$ is obtained by performing interpolation calculation on $|B_jH(f_j+\Delta f_2)|^2$ according to $\Delta f_2$, $\Delta f_1$ and $f_i$, and $$\frac{A_i^2}{B_i^2}|G(f_i)|^2$$

is obtained through division of two of them, hence obtaining the filtering characteristic $|G(f_i)|$ of the transmitting end.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

In the above embodiments, the emitter or the filtering module of the transmitter, the receiver or the transceiver may be reused in steps 301-302, steps 901-902, and steps 1201-1202. And furthermore, measurement equipment containing an emitter and a filtering module (which is equivalent to the filtering module of the transmitter, the receiver or the transceiver of which a filtering characteristic is to be measured) but containing no pre-equalizer may be used, rather than the transmitter, the receiver or the transceiver themselves are used. The first measurement signal and the second measurement signal are transmitted by the emitter of the measurement equipment, and then pass through the filtering module of the measurement equipment. Or, only the filtering module of the transmitter, the receiver or the transceiver is reused, and measurement equipment containing an emitter but containing no pre-equalizer is used. The first measurement signal and the second measurement signal are transmitted by the emitter of the measurement equipment, and then pass through the filtering module of the transmitter, the receiver or the transceiver.

Embodiment 4

Embodiment 4 of the present disclosure provides an apparatus for measuring a filtering characteristic. In this embodiment, a first measurement signal is a discrete signal, and a second measurement signal is a continuous signal. As a principle of the apparatus for solving problems is similar to that of the method in Embodiment 1, the implementation of the method in Embodiment 1 may be referred to for implementation of the apparatus, and repeated parts shall not be described herein any further.

FIG. 16 is a schematic diagram of an implementation of the apparatus of Embodiment 4. As shown in FIG. 16, the apparatus 1600 includes:
  a first processing unit 1601 configured to determine a filtering characteristic of a receiving end, or determine a joint response of a filtering characteristic of a transmitting end and a filtering characteristic of a receiving end, in a spectrum of a receiving signal obtained after a first measurement signal and a second measurement signal pass through respective filtering modules, according to a nonoverlapped spectral part of the first measurement signal and the second measurement signal.

In this embodiment, Embodiment 1 may be referred to for implementations of the first measurement signal and the second measurement signal, which shall not be described herein any further.

In this embodiment, step 303 in Embodiment 1 may be referred to for implementation of the first processing unit 1601, which shall not be described herein any further.

FIG. 17 is a schematic diagram of an implementation of the first processing unit 1601. As shown in FIG. 17, the first processing unit 1601 includes:
  a first measuring unit 1701 configured to calculate a power spectral density of the receiving signal;
  a first extracting unit configured 1702 to extract a first power spectral density of the nonoverlapped spectral part of the first measurement signal and the second measurement signal from a spectrum of the power spectral density of the receiving signal;
  a first calculating unit 1703 configured to calculate a second power spectral density of the second measurement signal after passing through the receiving end filtering module in an overlapped spectral part of the first measurement signal and the second measurement signal according to the first power spectral density; and
  a first determining unit 1704 configured to determine the filtering characteristic of the receiving end according to the first power spectral density and the second power spectral density.

Particular implementations of the first measuring unit 1701, the first extracting unit 1702, the first calculating unit 1703 and the first determining unit 1704 are identical to those of steps 401-404 in Embodiment 1, which shall not be described herein any further.

In this embodiment, alternatively, as shown in FIG. 16, the apparatus 1600 further includes:
  a second processing unit 1602 configured to determine the joint response according to the overlapped spectral part of the first measurement signal and the second measurement signal in the spectrum of the power spectral density of the receiving signal and the second power spectral density.

FIG. 18 is a schematic diagram of an implementation of the second processing unit 1602 in this embodiment. As shown in FIG. 18, the second processing unit 1602 includes:
  a determining unit 1801 configured to determine a third power spectral density of the overlapped spectral part of the first measurement signal and second measurement signal in the spectrum of the power spectral density of the receiving signal; and
  an acquiring unit 1802 configured to subtract the third power spectral density by the second power spectral density, so as to obtain the joint response.

In this embodiment, steps 501-502 in Embodiment 1 may be referred to for particular implementations of the determining unit 1801 and the acquiring unit 1802, which shall not be described herein any further.

In this embodiment, alternatively, the apparatus 1600 may further include: a fifth processing unit (not shown) configured to determine the filtering characteristic of the transmitting end according to the joint response and the filtering characteristic of the receiving end. Embodiment 1 may be referred to for particular implementation of the fifth processing unit, which shall not be described herein any further.

In this embodiment, the first measurement signal may be transmitted by an emitter of a communication equipment, such as a transmitter or a transceiver, of which a filtering characteristic is to be measured, and passes through to-be-measured filtering modules of the transmitting end and receiving end of the communication equipment; then the second measurement signal is transmitted, and passes through the to-be-measured filtering module of the receiving end of the communication equipment; and finally the filtering characteristics of the transmitting end and the receiving end and the joint response thereof are determined by the apparatus 1600 according to the acquired receiving signal.

FIG. 19 is another schematic diagram of the apparatus for measuring a filtering characteristic. As shown in FIG. 19, the apparatus 1900 includes:

- a first calculator 1901 configured to calculate the power spectral density of the receiving signal;
- a first extractor 1902 configured to extract the first power spectral density of the nonoverlapped spectral part of the first measurement signal and the second measurement signal from a spectrum of the power spectral density of the receiving signal;
- a second calculator 1903 configured to calculate a second power spectral density of the second measurement signal after passing through the receiving end filtering module in an overlapped spectral part of the first measurement signal and the second measurement signal according to the first power spectral density, so as to obtain the filtering characteristic of the receiving end at a measurement frequency point;
- a second extractor 1904 configured to extract a third power spectral density of the overlapped spectral part of the first measurement signal and second measurement signal in the spectrum of the power spectral density of the receiving signal;
- a subtractor 1905 configured to subtract the third power spectral density by the second power spectral density, so as to obtain the joint response; and
- a divider 1906 configured to divide a calculation result obtained by the subtractor 1905 by the second power spectral density obtained by the second calculator 1903, so as to obtain the filtering characteristic of the transmitting end.

In this embodiment, alternatively, the apparatus 1900 may further include: a processor (not shown) configured to move the power spectral density obtained by the first calculator 1901 through calculation by a first frequency, so as to obtain a power spectral density of the receiving signal with a frequency offset being removed; wherein, the frequency offset (the first frequency) is a value of a frequency offset between a transmitter laser and a local laser of the receiving end.

In this embodiment, steps 401-404 and 501-502 in Embodiment 1 may be referred to for particular implementations of the first calculator 1901, the first extractor 1902, the second calculator 1903, the second extractor 1904 and the subtractor 1905, which shall not be described herein any further.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

Embodiment 5

Embodiment 5 of the present disclosure further provides an apparatus for measuring a filtering characteristic. As a principle of the apparatus for solving problems is similar to that of the method in Embodiment 2, the implementation of the method in Embodiment 2 may be referred to for implementation of the apparatus, and repeated parts shall not be described herein any further.

In this embodiment, what differ from Embodiment 4 exist in that the first measurement signal is a continuous signal, the second measurement signal is a discrete signal, and the first processing unit 1601 is configured to determine a joint response of a filtering characteristic of a transmitting end and a filtering characteristic of a receiving end in a spectrum of a receiving signal according to a nonoverlapped spectral part of the first measurement signal and the second measurement signal.

In this embodiment, Embodiment 2 may be referred to for particular implementations of the first measurement signal and the second measurement signal, which shall not be described herein any further.

In this embodiment, step 903 in Embodiment 2 may be referred to for a particular implantation of the first processing unit 1601, which shall not be described herein any further.

FIG. 20 is a schematic diagram of another implementation of the first processing unit 1601. When the first measurement signal is a continuous signal, the second measurement signal is a discrete signal, as shown in FIG. 20, the first processing unit 1601 includes:

- a second measuring unit 2001 configured to calculate a power spectral density of the receiving signal;
- a second extracting unit 2002 configured to extract a fourth power spectral density of the nonoverlapped spectral part of the first measurement signal and the second measurement signal from a spectrum of the power spectral density of the receiving signal;
- a second calculating unit 2003 configured to calculate a fifth power spectral density of the first measurement signal after passing through the filtering modules in an overlapped spectral part of the first measurement signal and the second measurement signal according to the fourth power spectral density; and
- a second determining unit 2004 configured to determine the joint response according to the fourth power spectral density and the fifth power spectral density.

Particular implementations of the second measuring unit 2001, the second extracting unit 2002, the second calculating unit 2003 and the second determining unit 2004 are identical to those of steps 1001-1004 in Embodiment 2, which shall not be described herein any further.

In this embodiment, what differ from Embodiment 4 further exist in that the second processing unit 1602 is configured to determine the filtering characteristic of the receiving end according to the overlapped spectral part of the first measurement signal and the second measurement signal in the spectrum of the power spectral density of the receiving signal and the fifth power spectral density, the determining unit 1801 is configured to determine a sixth power spectral density of the overlapped spectral part of the first measurement signal and second measurement signal in the spectrum of the power spectral density of the receiving signal, and the acquiring unit 1802 is configured to subtract the sixth power spectral density by the fifth power spectral density, so as to obtain the filtering characteristic of the receiving end.

In this embodiment, steps 1101-1102 in Embodiment 2 may be referred to for particular implantations of the determining unit 1801 and the acquiring unit 1802, which shall not be described herein any further.

In this embodiment, the apparatus may further include: a fifth processing unit (not shown) configured to determine the filtering characteristic of the transmitting end according to the joint response and the filtering characteristic of the receiving end.

In this embodiment, alternatively, the apparatus 1600 may further include: a fifth processing unit (not shown) configured to determine the filtering characteristic of the transmitting end according to the joint response and the filtering characteristic of the receiving end. Embodiment 1 may be referred to for particular implementation of the fifth processing unit, which shall not be described herein any further.

In this embodiment, what differ from the apparatus 1900 in Embodiment 4 exist in: the first extractor 1902 is configured to extract the fourth power spectral density of the nonoverlapped spectral part of the first measurement signal and the second measurement signal from the spectrum of the power spectral density of the receiving signal; the second calculator 1903 is configured to calculate a fifth power spectral density of the first measurement signal after passing through the receiving end filtering module in the overlapped spectral part of the first measurement signal and the second measurement signal according to the fourth power spectral density, so as to obtain the joint response at a measurement frequency point; the second extractor 1904 is configured to extract a sixth power spectral density of the overlapped spectral part of the first measurement signal and second measurement signal in the spectrum of the power spectral density of the receiving signal; the subtractor 1905 is configured to subtract the sixth power spectral density by the fifth power spectral density, so as to obtain the filtering characteristic of the receiving end; and the divider 1906 is configured to divide a calculation result obtained by the subtractor 1905*by* the fifth power spectral density obtained by the second calculator 1903, so as to obtain the filtering characteristic of the transmitting end.

In this embodiment, alternatively, the apparatus 1900 may further include: a frequency offset estimation compensator (not shown) configured to estimate a first frequency according to the second calculator 1903, translate the fifth power spectral density by the first frequency to obtain a fifth power spectral density with a frequency offset being compensated, and transmit the compensated fifth power spectral density to the divider; wherein, the first frequency is a value of a frequency offset between a transmitter laser and a local laser of the receiving end.

Alternatively, the apparatus 1900 may further include: a processor (not shown) configured to determine a second frequency according to a subtraction result of the divider 1905, perform interpolation calculation on the above subtraction result with reference to the above-estimated first frequency to obtain a power spectral density with a first frequency offset and transmit it to the divider; wherein, the second frequency refers to a frequency offset of the second measurement signal at the receiving end.

It should be noted that in Embodiment 4, when the second measurement signal is a continuous signal, an effect of the second frequency needs not to be taken into account. In this embodiment, as the second measurement signal is a discrete signal, in order to improve accuracy of the measurement, the second frequency needs to be determined according to the above processor, and the power spectral density with the second frequency offset is transmitted to the divider.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

Embodiment 6

Embodiment 6 of the present disclosure further provides an apparatus for measuring a filtering characteristic. As a principle of the apparatus for solving problems is similar to that of the method in Embodiment 3, the implementation of the method in Embodiment 3 may be referred to for implementation of the apparatus, and repeated parts shall not be described herein any further.

In this embodiment, what differ from Embodiment 4 exist in that the first measurement signal is a discrete signal, the second measurement signal is also a discrete signal, amplitudes of the signals are different, and the first processing unit 1601 is configured to determine a joint response and the filtering characteristic of the transmitting end according to the nonoverlapped spectral part of the first measurement signal and the second measurement signal in the spectrum of the receiving signal.

In this embodiment, Embodiment 3 may be referred to for particular implementations of the first measurement signal and the second measurement signal, which shall not be described herein any further.

In this embodiment, step 1203 in Embodiment 3 may be referred to for a particular implantation of the first processing unit 1601, which shall not be described herein any further.

FIG. 21 is a schematic diagram of a further implementation of the first processing unit 1601. As shown in FIG. 21, the first processing unit 1601 includes:

a third calculating unit 2101 configured to calculate a power spectral density of the receiving signal;

a third extracting unit 2102 configured to extract a seventh power spectral density of a spectral part of the second measurement signal from a spectrum of the power spectral density of the receiving signal;

a third determining unit 2103 configured to determine the filtering characteristic of the receiving end according to the seventh power spectral density; and a fourth processing unit 2104 configured to extract an eighth power spectral density of a spectral part of the first measurement signal from the spectrum of the power spectral density of the receiving signal, and determine the joint response according to the eighth power spectral density.

Particular implementations of the third calculating unit 2101, the third extracting unit 2102, the third determining unit 2103 and the fourth processing unit 2104 are identical to those of steps 1301-1303 in Embodiment 3, which shall not be described herein any further.

In this embodiment, alternatively, the apparatus 1600 may further include: a fifth processing unit (not shown) configured to determine the filtering characteristic of the transmitting end according to the joint response and the filtering characteristic of the receiving end; wherein, Embodiment 1 may be referred to for a particular implementation, which shall not be described herein any further.

In this embodiment, as the first processing unit 1601 may directly determine the filtering characteristic of the receiving end and the joint response, the second processing unit 1602 is not needed.

FIG. 22 is a further schematic diagram of the apparatus for measuring a filtering characteristic. As shown in FIG. 22, the apparatus 2200 includes:

a first calculator 2201 configured to calculate the power spectral density of the receiving signal;

a first extractor 2202 configured to extract a seventh power spectral density of the spectral part of the second measurement signal from a spectrum of the power spectral density of the receiving signal;

a second extractor 2203 configured to extract an eighth power spectral density of the spectral part of the first measurement signal from the spectrum of the power spectral density of the receiving signal; and a divider 2204 configured to divide the eighth power spectral density obtained by the second extractor 2203 by the seventh power spectral density obtained by the first extractor 2202, so as to obtain the filtering characteristic of the transmitting end.

In this embodiment, steps 1301-1303 in Embodiment 3 may be referred to for particular implementations of the first calculator 2201, the first extractor 2202, the second extractor 2203 and the divider 2204, which shall not be described herein any further.

In this embodiment, the apparatus 2200 may further include: a frequency offset estimation compensator (not shown) configured to estimate a first frequency according to the eighth power spectral density, translate the eighth power spectral density by the first frequency to obtain an eighth power spectral density with a frequency offset being compensated, and transmit the compensated eighth power spectral density to the divider In this embodiment, alternatively, the apparatus 2200 may further include: a processor (not shown) configured to determine a second frequency according to the seventh power spectral density, perform interpolation calculation on the seventh power spectral density with reference to the above-determined first frequency to obtain a seventh power spectral density with a first frequency offset and transmit it to the divider; wherein, Embodiment 5 may be referred to for a particular implementation, which shall not be described herein any further.

In this embodiment, Embodiment 5 may be referred to for particular implementations of the first frequency and the second frequency, which shall not be described herein any further.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

It should be noted that the apparatuses for measuring a filtering characteristic in embodiments 4-6 may be used separately or in a combined manner. For example, the first processing unit 1601 may be configured to determine not only the filtering characteristic of the receiving end, but also the joint response, according to the nonoverlapped spectra of the first measurement signal and the second measurement signal, and this embodiment is not limited thereto.

In this embodiment, alternatively, when the emitter and filtering module of the transmitter or the transceiver are used, the apparatuses for measuring a filtering characteristic in embodiments 4-6 may further include a setting unit (not shown) configured to set the pre-equalizer of the transmitter or the transceiver, so as to disable the pre-equalizer. However, this embodiment is not limited thereto, and the setting unit may also be provided in a transmitter, a receiver, or a transceiver.

Embodiment 7

An embodiment of the present disclosure further provides a communication system, including an apparatus for measuring a filtering characteristic as described in embodiments 4-6, and further including a communication equipment, the communication equipment being a transmitter and a receiver connected to each other, or a transceiver.

FIG. 23 is a schematic diagram of an implementation of the communication system of Embodiment 7. As shown FIG. 23, the communication system 2300 includes the apparatus 1600 for measuring a filtering characteristic as described in embodiments 4-6, which is configured to measure a filtering characteristic of a receiving end, a filtering characteristic of a transmitting end and a joint response, a structure of which being as described in the above embodiments, and being not going to be described herein any further. The communication system includes a transmitter 2301 and a receiver 2302 connected to each other; wherein, FIGS. 1 and 2 may be referred to for particular schematic diagrams of the transmitter 2301 and the receiver 2302, which shall not be described herein any further. What differs from the transmitter and the receiver in FIGS. 1 and 2 exists in that in this embodiment, the emitter in the transmitter 2301 is configured to transmit the first measurement signal and/or the second measurement signal; wherein, embodiments 1-3 may be referred to for particular implementations of the first measurement signal and/or the second measurement signal, which shall not be described herein any further; or, a new emitter may be provided in the transmitter 2301 or the receiver 2302, which is configured to transmit the second measurement signal.

In this embodiment, in measuring the filtering characteristic, a pre-equalizer of the transmitter 2301 is disabled by a setting unit in the apparatus for measuring a filtering characteristic of the communication system (which may also be provided in the transmitter or the receiver). The emitter of the transmitter 2301 transmits a first measurement signal, passing through respective filtering modules of a transmitting end and a receiving end, and transmits a second measurement signal, passing through the above filtering module of the receiving end; then the receiver 2302 transmits a receiving signal obtained by the receiving end to the apparatus for measuring a filtering characteristic, which determines a final filtering characteristic of the receiving end or the transmitting end or a joint response, with a particular method being as that described in embodiments 1-3, which shall not be described herein any further.

FIG. 24 is a schematic diagram of another implementation of the communication system in Embodiment 7 of the present disclosure. As shown in FIG. 24, the communication system is a transceiver 2401. FIG. 25 is a schematic diagram of the transceiver 2401. As shown in FIG. 25, the transmitting end and the receiving end of the transceiver are connected in an optical loopback manner, and the transceiver 2401 includes: an emitter 2501, a pre-equalizer 2502, a digital-to-analog converting module 2503, a laser 2504, an optical modulator 2505, an optical coherent demodulator 2506, a local laser 2507, an analog-to-digital converting module 2508 and a receiving device 2509, with their particular implementations being similar to the modules of the transmitter and the receiver in FIGS. 1 and 2, which shall not be described herein any further. What differs from the transmitter and the receiver in FIGS. 1 and 2 exists in that in this embodiment, the emitter 2501 in the transceiver 2401 is configured to transmit the first measurement signal and/or the second measurement signal; wherein, embodiments 1-3 may be referred to for particular implementations of the first measurement signal and/or the second measurement signal, which shall not be described herein any further; or, a new emitter 2510 may be provided in the transmitter 2401, which is configured to transmit the second measurement signal.

In this embodiment, in measuring the filtering characteristic, a pre-equalizer of the transceiver 2401 is disabled by a setting unit in the apparatus for measuring a filtering characteristic of the communication system. The emitter of the transceiver 2401 transmits the first measurement signal, passing through respective filtering modules of a transmitting end and a receiving end, and the new emitter transmits the second measurement signal, passing through the above filtering module of the receiving end; then the transceiver 2401 transmits a receiving signal obtained by the receiving end to the apparatus for measuring a filtering characteristic, which determines a final filtering characteristic of the receiving end or the transmitting end or a joint response, with a particular method being as that described in embodiments 1-3, which shall not be described herein any further.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

Embodiment 8

Embodiment 8 of the present disclosure further provides a communication equipment, which differs from the communication equipment in Embodiment 7 that the functions of the apparatuses for measuring a filtering characteristic in embodiments 4-6 are incorporated into the communication equipment. The communication equipment may be a transmitter, a receiver, or a transceiver. For example, when the communication equipment is a transmitter, it is connected to another receiver; when the communication equipment is a receiver, it is connected to another transmitter; and when the communication equipment is a transceiver, a transmitting end and a receiving end of the transceiver are connected, such as in an optical loopback manner; however, this embodiment is not limited thereto.

FIG. 26 is a schematic diagram of the communication equipment of this embodiment. As shown in FIG. 26, the communication equipment 2600 may include a central processing unit (CPU) 2601 and a memory 2602, the memory 2602 being coupled to the central processing unit 2601. It should be noted that this figure is illustrative only, and other types of structures may also be used, so as to supplement or replace this structure and achieve telecommunications function or other functions. For example, the central processing unit 2601 is configured to control a emitter to transmit a first measurement signal and a second measurement signal.

In an implementation, the functions of the apparatuses for measuring a filtering characteristic described in any of embodiments 4-6 may be integrated into the central processing unit 2601.

In this implementation, the central processing unit 2601 may be configured to: determine a filtering characteristic of a receiving end, or determine a joint response of a filtering characteristic of a transmitting end and a filtering characteristic of a receiving end, in a spectrum of a receiving signal obtained after a first measurement signal and a second measurement signal pass through respective filtering modules, according to a nonoverlapped spectral part of the first measurement signal and the second measurement signal; wherein, the filtering modules through which the first measurement signal passes include a transmitting end filtering module and a receiving end filtering module, the filtering module through which the second measurement signal passes include the receiving end filtering module, spectral ranges of the first measurement signal and the second measurement signal are different, and at least one of them is a discrete signal.

For example, the central processing unit 2601 may be configured to calculate a power spectral density of the receiving signal when the first measurement signal is a discrete signal and the second measurement signal is a continuous signal, extract a first power spectral density of the nonoverlapped spectral part of the first measurement signal and the second measurement signal from a spectrum of the power spectral density of the receiving signal, calculate a second power spectral density of the second measurement signal after passing through the receiving end filtering module in an overlapped spectral part of the first measurement signal and the second measurement signal according to the first power spectral density, and determine the filtering characteristic of the receiving end according to the first power spectral density and the second power spectral density.

For example, the central processing unit 2601 may further be configured to determine the joint response according to the overlapped spectral part of the first measurement signal and the second measurement signal in the spectrum of the power spectral density of the receiving signal and the second power spectral density.

For example, the central processing unit 2601 may further be configured to, when the first measurement signal is a continuous signal and the second measurement signal is a discrete signal, calculate a power spectral density of the receiving signal, extract a fourth power spectral density of the nonoverlapped spectral part of the first measurement signal and the second measurement signal from a spectrum of the power spectral density of the receiving signal, calculate a fifth power spectral density of the first measurement signal after passing through the filtering modules in an overlapped spectral part of the first measurement signal and the second measurement signal according to the fourth power spectral density, and determine the joint response according to the fourth power spectral density and the fifth power spectral density.

For example, the central processing unit 2601 may further be configured to determine the filtering characteristic of the receiving end according to the overlapped spectral part of the first measurement signal and the second measurement signal in the spectrum of the power spectral density of the receiving signal and the fifth power spectral density.

For example, the central processing unit 2601 may further be configured to, when the first measurement signal is a discrete signal and the second measurement signal is a discrete signal, calculate a power spectral density of the receiving signal, extract a seventh power spectral density of a spectral part of the second measurement signal from a spectrum of the power spectral density of the receiving signal, and determine the filtering characteristic of the receiving end according to the seventh power spectral density.

For example, the central processing unit 2601 may further be configured to extract an eighth power spectral density of a spectral part of the first measurement signal from the spectrum of the power spectral density of the receiving signal, and determine the joint response according to the eighth power spectral density.

For example, the central processing unit 2601 may further be configured to determine the filtering characteristic of the transmitting end according to the joint response and the filtering characteristic of the receiving end.

In another implementation, the apparatuses for measuring a filtering characteristic described in embodiments 4-6 and the central processing unit 2601 may be configured separately. For example, the apparatus may be configured as a chip connected to the central processing unit 2601 (see 2603 in FIG. 26), with its functions being realized under control of the central processing unit 2601.

As shown in FIG. 26, the communication equipment 2600 may further include a communication module 2604, an input unit 2605, a display 2607, and a power supply 2608. It should be noted that the communication equipment 2600 does not necessarily include all the parts shown in FIG. 26, and furthermore, the communication equipment 2600 may include parts not shown in FIG. 26, and the related art may be referred to.

Figure 1:
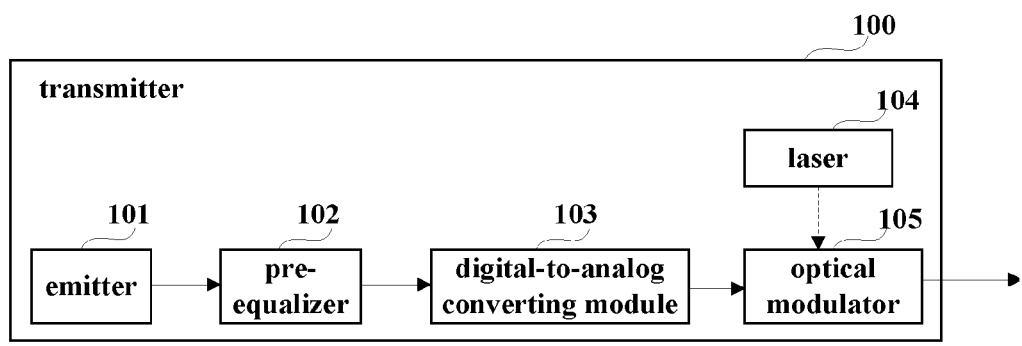

In this embodiment, when the communication equipment 2600 is a transmitter, it may further include a laser 2606, and the communication module 2604 is a signal transmitting module, and its structure may be identical to that of an existing transmitter, which may include, as shown in FIG. 1, an emitter 101, a pre-equalizer 102, a digital-to-analog converting module 103, a laser 104 and an optical modulator 105; however, the structure of the communication module 2604 is not limited to the above embodiment.

Figure 2:
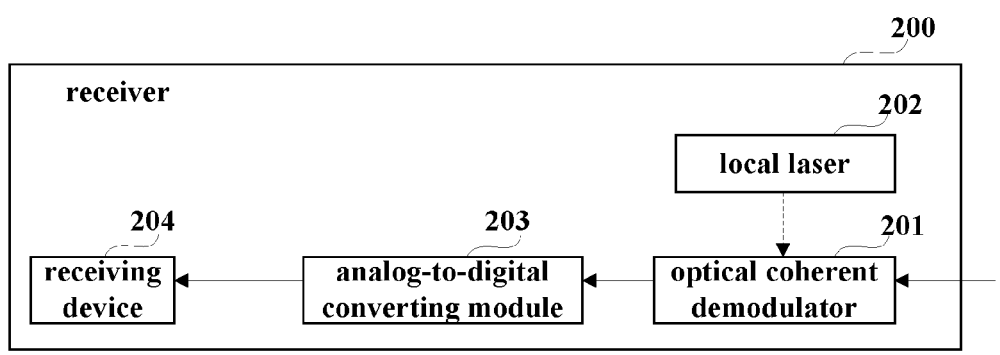

In this embodiment, when the communication equipment 2600 is a receiver, it may further include a local laser (not shown), and the communication module 2604 is a signal receiving module, and its structure may be identical to that of an existing receiver, which may include, as shown in FIG. 2, an optical coherent demodulator 201, an analog-to digital converting module 203 and a receiving device 204; however, the structure of the communication module 2604 is not limited to the above embodiment.

In this embodiment, when the communication equipment 2600 is a transceiver, it may further include a laser 2606 and a local laser (not shown), and the communication module 2604 is a signal transmitting and receiving module, and its structure may be identical to that of an existing transceiver; for example, a transmitting module is similar to a transmitter, and a receiving module is similar to a receiver; however, the structure of the communication module 2604 is not limited to the above embodiment.

In this embodiment, when the apparatus for measuring a filtering characteristic does not include a setting unit, the communication equipment 2600 may further include a setting unit (not shown) configured to set the pre-equalizer of the transmitter or the transceiver, so as to disable the pre-equalizer; however, the setting unit may be carried out by the input unit 2605.

As shown in FIG. 26, the central processing unit 2601 is sometimes referred to as a controller or control, and may include a microprocessor or other processor devices and/or logic devices. The central processing unit 2601 receives input and controls operations of every components of the communication equipment 2600.

In this embodiment, the memory 2602 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 2601 may execute the program stored in the memory 2602, so as to realize information storage or processing, etc. Functions of other parts are similar to those of the related art, which shall not be described herein any further. The parts of the communication equipment 2600 may be realized by specific hardware, firmware, software, or any combination thereof, without departing from the scope of the present disclosure.

In this embodiment, the communication equipment 2600 is, for example, a transmitter. And in measuring a filtering characteristic, the pre-equalizer in the communication module 2604 is disabled by the setting unit in the apparatus 2603 for measuring a filtering characteristic or the setting unit (such as the input unit 2605) in the communication equipment 2600. Then, under control of the CPU, the emitter in the communication module 2604 is enabled to transmit the first measurement signal and the second measurement signal. The first measurement signal passes through the transmitting end filtering module of the communication module 2604, and the second measurement signal is overlapped with the first measurement signal passing through the transmitting end filtering module and passes through the receiving end filtering module of the receiver connected to the transmitter. Thereafter, under control of the CPU, the obtained receiving signal is transmitted to the apparatus 2603 for measuring a filtering characteristic, which determines the final filtering characteristic of the receiving end or the transmitting end or the joint response, a particular method being as that described in embodiments 1-3, and being not going to be described herein any further. Furthermore, a new emitter (not shown) may be provided in the communication equipment 2600, which is configured to transmit at least one of the first measurement signal and the second measurement signal.

In this embodiment, the communication equipment 2600 is, for example, a transceiver. And in measuring a filtering characteristic, the pre-equalizer in the communication module 2604 is disabled by the setting unit in the apparatus 2603 for measuring a filtering characteristic or the setting unit (such as the input unit 2605) in the communication equipment 2600. Then, under control of the CPU, the emitter in the communication module 2604 is enabled to transmit the first measurement signal and the second measurement signal. The first measurement signal passes through the transmitting end filtering module, and the second measurement signal is overlapped with the first measurement signal passing through the transmitting end filtering module and passes through the receiving end filtering module. Thereafter, under control of the CPU, the obtained receiving signal is transmitted to the apparatus 2603 for measuring a filtering characteristic, which determines the final filtering characteristic of the receiving end or the transmitting end or the joint response, a particular method being as that described in embodiments 1-3, and being not going to be described herein any further. Furthermore, a new emitter (not shown)

may be provided in the communication equipment 2600, which is configured to transmit at least one of the first measurement signal and the second measurement signal. For example, the emitter may be provided between the transmitting end and the receiving end of the communication module 2604 between the optical modulator and the optical coherent demodulator, or may also be provided out of the communication module 2604.

In this embodiment, the communication equipment 2600 is, for example, a receiver. And in measuring a filtering characteristic, the pre-equalizer of the transmitter connected to the receiver is disabled by the setting unit in the apparatus 2603 for measuring a filtering characteristic or the setting unit (such as the input unit 2605) in the communication equipment 2600. Then, under control of the CPU, the emitter of the transmitter connected to the receiver is enabled to transmit the first measurement signal and the second measurement signal. The first measurement signal passes through the transmitting end filtering module of the transmitter connected to the receiver, and the second measurement signal is overlapped with the first measurement signal passing through the transmitting end filtering module, transmitted to the receiver and passes through the receiving end filtering module of the communication module 2604. Thereafter, under control of the CPU, the obtained receiving signal is transmitted to the apparatus 2603 for measuring a filtering characteristic, which determines the final filtering characteristic of the receiving end or the transmitting end or the joint response, a particular method being as that described in embodiments 1-3, and being not going to be described herein any further. Furthermore, a new emitter (not shown) may be provided in the communication equipment 2600, which is configured to transmit at least one of the first measurement signal and the second measurement signal.

In this embodiment, the functions of the above apparatus 2603 for measuring a filtering characteristic may be carried out by the CPU 2601, and after obtaining the receiving signal, the CPU 2601 may directly use the methods in embodiments 1-3 to determine the final filtering characteristic of the receiving end or the transmitting end or the joint response, which shall not be described herein any further.

In this embodiment, the first measurement signal and the second measurement signal may be transmitted simultaneously or sequentially, such that the second measurement signal passes through the receiving end filtering module after being overlapped with the first measurement signal passing through the transmitting end filtering module.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristics by using instruments.

Embodiment 9

Embodiment 9 further provides an apparatus for measuring a filtering characteristic, which differs from the apparatuses of embodiments 4-6 in that in this embodiment, a emitter of an existing transmitter or a transceiver is not used, and only filtering modules of an existing transmitter, receiver or transceiver are used.

FIG. 27 is a schematic diagram of an implementation of the apparatus of Embodiment 9. As shown in FIG. 27, the apparatus 2700 includes a first processing unit 2701; wherein, the first processing unit 1601 in embodiments 4-6 may be referred to for a particular implementation of the first processing unit 2701, which shall not be described herein any further.

In this embodiment, the apparatus 2700 may further include a first transmitting unit 2702 configured to transmit a first measurement signal and a second measurement signal. The first measurement signal passes through a transmitting end filtering module of a receiver or a transceiver, and the second measurement signal is overlapped with the first measurement signal passing through the transmitting end filtering module and passes through a receiving end filtering module of the transceiver or the receiver, so as to obtain a receiving signal. And the first processing unit 2701 may obtain the receiving signal, and determine the final filtering characteristic of the receiving end and the joint response, a particular method being as described in embodiments 1-3, which shall not be described herein any further.

In this embodiment, as it is not needed to make the first measurement signal transmitted by the first transmitting unit 2702 pass through a pre-equalizer of an existing transmitter or transceiver, the apparatus does not need the setting unit in embodiments 4-6.

In this embodiment, a second processing unit (which is optional and not shown) and a fifth processing unit (not shown) may further be included; wherein, embodiments 4-6 may be referred to for particular implementations, which shall not be described herein any further.

In this embodiment, when the communication equipment is a transmitter or a transceiver, the apparatus 2700 for measuring a filtering characteristic transmit the first measurement signal and the second measurement signal, and transmit the first measurement signal to the communication equipment. The communication equipment receives the first measurement signal transmitted by the apparatus 2700, makes the first measurement signal to pass through the transmitting end filtering module of the transmitter or transceiver of itself and pass through the receiving end filtering module of the receiver connected to the transmitter or the transceiver, makes the second measurement signal pass through only the receiving end filtering module in the transceiver or the receiving end filtering module of the receiver connected to the transmitter, and transmits the receiving signal obtained at the receiving end to the apparatus 2700. The apparatus 2700 receives the receiving signal fed back by the communication equipment and determines the final filtering characteristics of the receiving end and the transmitting end and the joint response thereof, a particular determination method being as described in embodiments 1-3, which shall not be described herein any further.

It can be seen from this embodiment that without changing parameters of the system, the filtering characteristics of the receiving end and the transmitting end and the joint response may be determined by using two measurement signals and the transmitter and the receiver themselves, with no need of use of extra instrument, thereby avoiding the problems of high cost and uneasy large-scale use brought about by measurement of filtering characteristic by using instruments.

Embodiment 10

Embodiment 10 further provides an apparatus for measuring a filtering characteristic, which differs from the apparatus 2700 in Embodiment 9 in that in this embodiment, a transmitting end filtering module of an existing transmitter or transceiver and a receiving end filtering module of an existing receiver or transceiver are not used.

FIG. 28 is a schematic diagram of an implementation of the apparatus of Embodiment 10. As shown in FIG. 28, the apparatus 2800 includes a first processing unit 2801 and a first transmitting unit 2802; wherein, the first processing unit 2701 and the first transmitting unit 2702 in Embodiment 9 may be referred to for particular implementations, which shall not be described herein any further.

In this embodiment, the apparatus 2800 may further include a transmitting end filtering module 2803, which is equivalent to a filtering module of a transmitter or a transceiver of which a transmitting end filtering characteristic is to be measured, and a receiving end filtering module 2804, which is equivalent to a filtering module of a receiver or a transceiver of which a receiving end filtering characteristic is to be measured. The first transmitting unit 2802 transmits the first measurement signal to the transmitting end filtering module 2803, and transmits the second measurement signal to the receiving end filtering module 2804, so as to obtain a receiving signal. Then the first processing unit 2801 determines the final filtering characteristic of the receiving end or the joint response; wherein, embodiments 1-3 may be referred to for a particular implementation, which shall not be described herein any further.

In this embodiment, a second processing unit (which is optional and not shown) and a fifth processing unit (not shown) may further be included; wherein, embodiments 4-6 may be referred to for particular implementations, which shall not be described herein any further.

In this embodiment, after determining the filtering characteristic of the transmitting end, the apparatus 2800 may transmit the filtering characteristic to communication equipment, such as a pre-equalizer of a transceiver or a transmitter, so that the pre-equalizer determines a pre-equalizer coefficient according to the filtering characteristic of the transmitting end, for use in pre-equalization processing.

It can be seen from this embodiment that measurement is performed once on two measurement signals, the filtering characteristics of the receiving end and the transmitting end may be determined, thus without changing parameters of the system, the filtering characteristics of the receiving end and the transmitting end may be determined by using the transmitter and the receiver themselves, with no need of use of extra instrument, thereby avoiding the problems of high cost and uneasy large-scale use brought about by measurement of filtering characteristic by using instruments.

Embodiment 11

Embodiment 11 further provides a pre-equalizer. FIG. 29 is a schematic diagram of the pre-equalizer of this embodiment. The pre-equalizer 2900 includes:
  a characteristic measuring unit 2901 including an apparatus for measuring a filtering characteristic and configured to determine a filtering characteristic of a transmitting end; and
  a pre-equalizing unit 2902 configured to determine a coefficient of the pre-equalizer according to the filtering characteristic of the transmitting end, and perform pre-equalization on a transmission signal by using the coefficient of the pre-equalizer.

In this embodiment, any one of the apparatuses for measuring a filtering characteristic in embodiments 4-6 or 9 or 10 may be referred to for a particular implementation of the characteristic measuring unit 2901; and furthermore, the pre-equalizing unit 2902 may determine the coefficient of the pre-equalizer by using a zero-forcing method, and a minimum mean square error method, etc., and perform the pre-equalization on the receiving signal by using the coefficient and using a constant modulus algorithm, and this embodiment is not limited thereto.

Embodiment 12

Embodiment 12 provides a communication equipment, which may be a transceiver or a transmitter, and include the pre-equalizer in Embodiment 11; wherein, Embodiment 11 may be referred to for a particular implementation, which shall not be described herein any further.

It can be seen from this embodiment that measurement is performed once on two measurement signals, the filtering characteristics of the receiving end and the transmitting end may be determined, thus without changing parameters of the system, the filtering characteristics of the receiving end and the transmitting end may be determined by using the transmitter and the receiver themselves, with no need of use of extra instrument, thereby avoiding the problems of high cost and uneasy large-scale use brought about by measurement of filtering characteristic by using instruments. And furthermore, the pre-equalizer coefficient may be obtained by using the filtering characteristic measured above, so as to use the pre-equalizer coefficient to compensate for filtering damages brought about by the filtering module.

An embodiment of the present disclosure further provides a computer-readable program, wherein when the program is executed in an apparatus for measuring a filtering characteristic, the program enables a computer to carry out the method for measuring a filtering characteristic as described in embodiments 1-3 in the apparatus for measuring a filtering characteristic.

An embodiment of the present disclosure provides a storage medium in which a computer-readable program is stored, wherein the computer-readable program enables a computer to carry out the method for measuring a filtering characteristic as described in embodiments 1-3 in an apparatus for measuring a filtering characteristic.

The preferred embodiments of the present disclosure are described above with reference to the drawings. The many features and advantages of the embodiments are apparent from the detailed specification and, thus, it is intended by the appended claims to cover all such features and advantages of the embodiments that fall within the scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

For implementations of the present disclosure containing the above embodiments, following supplements are further disclosed.

Supplement 1. An apparatus for measuring a filtering characteristic, including:

a first processing unit configured to determine a filtering characteristic of a receiving end, or determine a joint response of a filtering characteristic of a transmitting end and a filtering characteristic of a receiving end, in a spectrum of a receiving signal obtained after a first measurement signal and a second measurement signal pass through respective filtering modules, according to a nonoverlapped spectral part of the first measurement signal and the second measurement signal;

wherein, the filtering modules through which the first measurement signal passes include a transmitting end filtering module and a receiving end filtering module, the filtering module through which the second measurement signal passes include the receiving end filtering module, spectral ranges of the first measurement signal and the second measurement signal are different, and at least one of them is a discrete signal.

Supplement 2. The apparatus according to supplement 1, wherein when the first measurement signal is a discrete signal and the second measurement signal is a continuous signal, the first processing unit includes:

a first measuring unit configured to calculate a power spectral density of the receiving signal;

a first extracting unit configured to extract a first power spectral density of the nonoverlapped spectral part of the first measurement signal and the second measurement signal from a spectrum of the power spectral density of the receiving signal;

a first calculating unit configured to calculate a second power spectral density of the second measurement signal after passing through the receiving end filtering module in an overlapped spectral part of the first measurement signal and the second measurement signal according to the first power spectral density; and a first determining unit configured to determine the filtering characteristic of the receiving end according to the first power spectral density and the second power spectral density.

Supplement 3. The apparatus according to supplement 2, wherein the apparatus further includes:

a second processing unit configured to determine the joint response according to the overlapped spectral part of the first measurement signal and the second measurement signal in the spectrum of the power spectral density of the receiving signal and the second power spectral density.

Supplement 4. The apparatus according to supplement 3, wherein the second processing unit is configured to determine a third power spectral density of the overlapped spectral part of the first measurement signal and second measurement signal, and subtract the third power spectral density by the second power spectral density, so as to obtain the joint response.

Supplement 5. The apparatus according to supplement 1, wherein when the first measurement signal is a continuous signal and the second measurement signal is a discrete signal, the first processing unit includes:

a second measuring unit configured to calculate a power spectral density of the receiving signal;

a second extracting unit configured to extract a fourth power spectral density of the nonoverlapped spectral part of the first measurement signal and the second measurement signal from a spectrum of the power spectral density of the receiving signal;

a second calculating unit configured to calculate a fifth power spectral density of the first measurement signal after passing through the filtering modules in an overlapped spectral part of the first measurement signal and the second measurement signal, according to the fourth power spectral density; and a second determining unit configured to determine the joint response according to the fourth power spectral density and the fifth power spectral density.

Supplement 6. The apparatus according to supplement 5, wherein the apparatus further includes:

a third processing unit configured to determine the filtering characteristic of the receiving end according to the overlapped spectral part of the first measurement signal and the second measurement signal in the spectrum of the power spectral density of the receiving signal and the fifth power spectral density.

Supplement 7. The apparatus according to supplement 6, wherein the third processing unit is configured to determine a sixth power spectral density of the overlapped spectral part of the first measurement signal and second measurement signal, and subtract the sixth power spectral density by the fifth power spectral density, so as to obtain the filtering characteristic of the receiving end.

Supplement 8. The apparatus according to supplement 1, wherein when the first measurement signal is a discrete signal and the second measurement signal is a discrete signal, the first processing unit includes:

a third calculating unit configured to calculate a power spectral density of the receiving signal;

a third extracting unit configured to extract a seventh power spectral density of a spectral part of the second measurement signal from a spectrum of the power spectral density of the receiving signal; and a third determining unit configured to determine the filtering characteristic of the receiving end according to the seventh power spectral density.

Supplement 9. The apparatus according to supplement 8, wherein the apparatus further includes:

a fourth processing unit configured to extract an eighth power spectral density of a spectral part of the first measurement signal from the spectrum of the power spectral density of the receiving signal, and determine the joint response according to the eighth power spectral density.

Supplement 10. The apparatus according to supplement 3, wherein the apparatus further includes:

a fifth processing unit configured to determine the filtering characteristic of the transmitting end according to the joint response and the filtering characteristic of the receiving end.

Supplement 11. The apparatus according to supplement 6, wherein the apparatus further includes:

a fifth processing unit configured to determine the filtering characteristic of the transmitting end according to the joint response and the filtering characteristic of the receiving end.

Supplement 12. The apparatus according to supplement 9, wherein the apparatus further includes:

a fifth processing unit configured to determine the filtering characteristic of the transmitting end according to the joint response and the filtering characteristic of the receiving end.

Supplement 13. The apparatus according to supplement 3, wherein the first measuring unit further includes a calculating module configured to move the power spectral density obtained through calculation by a first frequency, and the first measuring unit determines a power spectral density of the receiving signal with the first frequency being removed according to the first frequency; and wherein the first frequency is a value of a frequency offset between a transmitter laser and a local laser of the receiving end.

Supplement 14. The apparatus according to supplement 7, wherein the third processing unit further includes determining a second frequency according to a result of subtraction of the sixth power spectral density by the fifth power spectral density, performing interpolation calculation on the subtraction result according to a first frequency to obtain a power spectral density with a frequency offset of the second frequency, so as to obtain the filtering characteristic of the receiving end; wherein, the second frequency is a frequency offset of the second measurement signal at the receiving end, and the first frequency is a value of a frequency offset between a transmitter laser and a local laser of the receiving end.

Supplement 15. A pre-equalizer, including:
a characteristic measuring unit configured to determine a filtering characteristic of a transmitting end and including the apparatus for measuring a filtering characteristic as supplemented in supplement 8; and
a pre-equalizing unit configured to determine a coefficient of the pre-equalizer according to the filtering characteristic of the transmitting end, and perform pre-equalization on a transmission signal by using the coefficient of the pre-equalizer.

Supplement 16. An optical communication equipment, including the apparatus for measuring a filtering characteristic as described in supplement 1.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An apparatus for measuring a filtering characteristic, including:
processor circuitry configured to:
one of determine a filtering characteristic of a receiving end and determine a joint response of the filtering characteristic of a transmitting end and the filtering characteristic of the receiving end, in a spectrum of a received signal obtained after a first measurement signal and a second measurement signal pass through respective filtering modules, according to a nonoverlapped spectral part of the first measurement signal and the second measurement signal;
wherein, the filtering modules through which the first measurement signal passes include a transmitting end filtering module and a receiving end filtering module, a filtering module through which the second measurement signal passes includes the receiving end filtering module, spectral ranges of the first measurement signal and the second measurement signal are different, and at least one of the first measurement signal and the second measurement signal is a discrete signal;
wherein when the first measurement signal is the discrete signal and the second measurement signal is a continuous signal, the processor circuitry further configured to:
calculate a calculated power spectral density of the received signal;
extract a first power spectral density of the nonoverlapped spectral part of the first measurement signal and the second measurement signal from a spectrum of the calculated power spectral density of the received signal;
calculate a second power spectral density of the second measurement signal after passing through the receiving end filtering module in an overlapped spectral part of the first measurement signal and the second measurement signal according to the first power spectral density, and
determine the filtering characteristic of the receiving end according to the first power spectral density and the second power spectral density.

2. The apparatus according to claim 1, wherein the processor circuitry further configured to:
determine the joint response according to the overlapped spectral part of the first measurement signal and the second measurement signal in the spectrum of the calculated power spectral density of the received signal and the second power spectral density.

3. The apparatus according to claim 2, wherein the processor circuitry further configured to: determine a third power spectral density of the overlapped spectral part of the first measurement signal and second measurement signal, and subtract the third power spectral density from the second power spectral density to obtain the joint response.

4. The apparatus according to claim 2, wherein the processor circuitry further configured to:
determine the filtering characteristic of the transmitting end according to the joint response and the filtering characteristic of the receiving end.

5. A pre-equalizer, including:
processor circuitry configured to:
determine a filtering characteristic of a transmitting end and including the apparatus for measuring a filtering characteristic as claimed in claim 4; and
determine a coefficient of the pre-equalizer according to the filtering characteristic of the transmitting end, and perform pre-equalization on a transmission signal by using the coefficient of the pre-equalizer.

6. The apparatus according to claim 2, wherein the processor circuitry further configured to: calculate the calculated power spectral density obtained through calculation by a first frequency, and the processor circuitry further configured to: determine another power spectral density of the received signal with the first frequency being removed according to the first frequency; and wherein the first frequency is a value of a frequency offset between a transmitter laser and a local laser of the receiving end.

7. An optical communication equipment, including the apparatus for measuring a filtering characteristic as described in claim 1.

8. An apparatus for measuring a filtering characteristic, including:
processor circuitry configured to:
one of determine a filtering characteristic of a receiving end and determine a joint response of the filtering characteristic of a transmitting end and the filtering characteristic of the receiving end, in a spectrum of a received signal obtained after a first measurement signal and a second measurement signal pass through respective filtering modules, according to a nonoverlapped spectral part of the first measurement signal and the second measurement signal;
wherein, the filtering modules through which the first measurement signal passes include a transmitting end filtering module and a receiving end filtering module, a filtering module through which the second measurement signal passes includes the receiving end filtering module, spectral ranges of the first measurement signal and the second measurement signal are different, and at least one of the first measurement signal and the second measurement signal is a discrete signal, wherein when the first measurement signal is a continuous signal and the second measurement signal is the discrete signal, the processor circuitry further configured to:

calculate a calculated power spectral density of the received signal;

extract a fourth power spectral density of the nonoverlapped spectral part of the first measurement signal and the second measurement signal from a spectrum of the calculated power spectral density of the received signal;

calculate a fifth power spectral density of the first measurement signal after passing through filtering modules in an overlapped spectral part of the first measurement signal and the second measurement signal, according to the fourth power spectral density; and determine the joint response according to the fourth power spectral density and the fifth power spectral density.

9. The apparatus according to claim 8, wherein the processor circuitry further configured to:

determine the filtering characteristic of the receiving end according to the overlapped spectral part of the first measurement signal and the second measurement signal in the spectrum of the calculated power spectral density of the received signal and the fifth power spectral density.

10. The apparatus according to claim 9, wherein the processor circuitry further configured to: determine a sixth power spectral density of the overlapped spectral part of the first measurement signal and second measurement signal, and subtract the sixth spectral density from the fifth power spectral density to obtain the filtering characteristic of the receiving end.

11. The apparatus according to claim 9, wherein the processor circuitry further configured to:

determine the filtering characteristic of the transmitting end according to the joint response and the filtering characteristic of the receiving end.

12. A pre-equalizer, including:

processor circuitry configured to:

determine a filtering characteristic of a transmitting end and including the apparatus for measuring a filtering characteristic as claimed in claim 11; and determine a coefficient of the pre-equalizer according to the filtering characteristic of the transmitting end, and perform pre-equalization on a transmission signal by using the coefficient of the pre-equalizer.

13. The apparatus according to claim 10, wherein the processor circuitry further configured to:

determine a second frequency according to a result of subtraction of the sixth power spectral density from the fifth power spectral density, performing an interpolation calculation on the result according to a first frequency to obtain another power spectral density with a frequency offset of the second frequency to obtain the filtering characteristic of the receiving end; wherein, the second frequency is a frequency offset of the second measurement signal at the receiving end, and the first frequency is a value of the frequency offset between a transmitter laser and a local laser of the receiving end.

14. An optical communication equipment, including the apparatus for measuring a filtering characteristic as described in claim 8.

15. An apparatus for measuring a filtering characteristic, including:

processor circuitry configured to:

one of determine a filtering characteristic of a receiving end and determine a joint response of the filtering characteristic of a transmitting end and the filtering characteristic of the receiving end, in a spectrum of a received signal obtained after a first measurement signal and a second measurement signal pass through respective filtering modules, according to a nonoverlapped spectral part of the first measurement signal and the second measurement signal;

wherein, the filtering modules through which the first measurement signal passes include a transmitting end filtering module and a receiving end filtering module, a filtering module through which the second measurement signal passes includes the receiving end filtering module, spectral ranges of the first measurement signal and the second measurement signal are different, and at least one of the first measurement signal and the second measurement signal is a discrete signal, wherein when the first measurement signal is the discrete signal and the second measurement signal is the discrete signal, the processor circuitry further configured to:

calculate a calculated power spectral density of the receiving signal;

extract a seventh power spectral density of a spectral part of the second measurement signal from a spectrum of the calculated power spectral density of the received signal; and determine the filtering characteristic of the receiving end according to the seventh power spectral density.

16. The apparatus according to claim 15, wherein the processor circuitry further configured to:

extract an eighth power spectral density of the spectral part of the first measurement signal from the spectrum of the calculated power spectral density of the received signal, and determine the joint response according to the eighth power spectral density.

17. The apparatus according to claim 16, wherein the processor circuitry further configured to:

determine the filtering characteristic of the transmitting end according to the joint response and the filtering characteristic of the receiving end.

18. A pre-equalizer, including:

processor circuitry configured to:

determine a filtering characteristic of a transmitting end and including the apparatus for measuring a filtering characteristic as claimed in claim 17; and determine a coefficient of the pre-equalizer according to the filtering characteristic of the transmitting end, and perform pre-equalization on a transmission signal by using the coefficient of the pre-equalizer.

19. An optical communication equipment, including the apparatus for measuring a filtering characteristic as described in claim 15.

* * * * *